United States Patent [19]
Morgan

[11] Patent Number: 4,635,096
[45] Date of Patent: Jan. 6, 1987

[54] TEST SIGNAL GENERATOR

[75] Inventor: Donald E. Morgan, Saratoga, Calif.

[73] Assignee: Sony Corporation, Tokyo, Japan

[21] Appl. No.: 483,376

[22] Filed: Apr. 8, 1983

[51] Int. Cl.$^4$ .................... H04N 17/00; H04N 17/04
[52] U.S. Cl. .................................... 358/10; 358/139;
377/44; 371/20
[58] Field of Search ................... 358/10, 139, 150, 19;
371/27, 20; 364/550, 579; 340/514; 324/404;
377/44

[56] References Cited

U.S. PATENT DOCUMENTS

| | | | |
|---|---|---|---|
| 3,781,829 | 12/1973 | Singh | 371/27 |
| 4,408,337 | 10/1983 | Pham Van Cang | 377/44 |
| 4,538,268 | 8/1985 | Pham Van Cang | 358/10 X |
| 4,554,663 | 11/1985 | Pham Van Cang | 371/20 |
| 4,559,553 | 12/1985 | Van Cang | 358/10 |

OTHER PUBLICATIONS

N. H. Burkies and J. G. Wade, *IEEE Transactions on Broadcasting*, vol. BC-26, No. 3, Sep. 1980, pp. 82-90.

*Primary Examiner*—Michael A. Masinick
*Assistant Examiner*—Robert M. Bauer
*Attorney, Agent, or Firm*—Limbach, Limbach & Sutton

[57] ABSTRACT

A test signal generator for generating signals for use in a high definition television, the apparatus including means for storing a plurality of pattern segments which are representative of selected portions of the test signal to be generated, and means for retrieving predetermined ones of the stored pattern segments and for repeating or holding selected ones of the retrieved pattern segments in a predetermined sequence in order to construct, in real time, the entire test signal waveform, and also including means for converting the sequence of retrieved pattern segments into the test signal. The present invention is especially suited for the automatic generation of a series of different test signals wherein the test signal generating means described above are controlled by means which memorize the order in which selected test signals are desired to be generated, and which also supply to the test signal generating means the required pattern segment for the test signal to be generated as well as the order in which the test signals are to be generated. The present invention permits the generation of substantially all of the standard test signal patterns for testing high definition television, including color bars. In the color bar generation mode, unique transversal filters are enabled in each of the red, green, blue and black burst channels to eliminate any residual sampling component present therein.

28 Claims, 15 Drawing Figures

ADDRESS TABLE

| | ADDR COUNTER (88) [120] | STARTING ADDR TO RUN COUNTER (56) [122] | SEGMENT LENGTH DATA TO LENGTH COUNTER (70) [124] | HOLD COMMAND [126] | PATTERN [128] |
|---|---|---|---|---|---|
| LINE 1 | 0 | 0 | 4 | NO | ⌐ |
| | 1 | 7 | 1270 | YES | ⎯ |
| | 2 | 8 | 4 | NO | ⌠ |
| | 3 | 16 | 106 | YES | ⌐ |
| | 4 | 0 | 4 | NO | ⌐ |
| | 5 | 7 | 1270 | YES | ⎯ |
| | 6 | 8 | 4 | NO | ⌠ |
| | 7 | 16 | 106 | YES | ⌐ |
| | ⋮ | ⋮ | ⋮ | ⋮ | ⋮ |
| LINE 6 | 39 | 0 | 4 | NO | ⌐ |
| | 40 | 7 | 114 | YES | ⌠ |
| | 41 | 8 | 4 | NO | ∿∿∿ |
| | 42 | 17 | 114 | NO | |
| | 43 | 16 | 1370 | YES | ⌐ |
| | 44 | 0 | 4 | NO | ⌐ |
| | 45 | 7 | 114 | YES | ⌠ |
| | 46 | 8 | 4 | NO | ⌐ |
| | 47 | 16 | 1370 | YES | ⌐ |
| | ⋮ | ⋮ | ⋮ | ⋮ | ⋮ |
| LINE 39 | a | 0 | 4 | NO | ⌐ |
| | b | 7 | 2280 | YES | ⌠ |
| | c | 8 | 4 | NO | ∿∿∿ |
| | d | 17 | 114 | NO | ⌢ |
| | e | 132 | 2260 | NO | |
| | f | 16 | 65 | YES | ⌐ |
| | g | 0 | 4 | NO | |
| | ⋮ | ⋮ | ⋮ | ⋮ | ⋮ |

*FIG. 3.*

TEST SIGNAL GENERATOR

DESCRIPTION

1. Technical Field

The present invention is directed to test signal generators and more particularly to test signal generators for high definition television.

2. Background Art

The typical test signal generator is intended for use with standard television receivers, i.e., receivers operating at NTSC or PAL frequencies. Earlier versions of these generators utilized analog circuitry for generating the desired test signals. Later versions generated the test signals digitally. In these later versions, the entire analog patterns sought to be generated were digitized and stored in high speed read only memory (ROM). Digital data were then read directly from these high speed ROMs and converted back into analog form.

The higher resolution capabilities of high definition television (HDTV) require a higher resolution test signal than that available from test signal generators of the prior art. Such HDTV typically require 30 MHz bandwith rise time test signals. High speed ROMs which are currently available are incapable of operating at such speeds.

DISCLOSURE OF INVENTION

These and other problems of prior art test signal generators are overcome by the present invention of a test signal generator comprising means for storing a plurality of pattern segments which are representative of selected portions of the test signal to be generated and means for retrieving predetermined ones of the stored pattern segments and for repeating or holding selected ones of the retrieved pattern segments in a predetermined order to reconstruct, in real time, a sequence of the retrieved pattern segments which is representative of the entire test signal, and means for converting the sequence of retrieved pattern segments into the test signal.

In one embodiment of the present invention the storing means include a plurality of addressable memories which are addressed in parallel to produce a set of binary words in response to each address supplied thereto. Means are also provided for converting each set of binary words into a serial stream of binary words so that each binary word in the serial stream appears at a substantially higher frequency or rate than the rate at which it was read out of the storing means.

The above described structure lends itself to incorporation into a test signal generator system wherein the storing means are random access memories the contents of which can be changed during the vertical retrace period of the HDTV being tested so that a sequence of different test signal patterns can be provided to the monitor in a dynamic fashion. The television test signal generator system of the invention includes the above mentioned means for storing a plurality of pattern segments, as well as the means for retrieving predetermined ones of the stored pattern segments and for repeating or holding selected ones of the retrieved pattern segments in a predetermined order to reconstruct in real time the desired video test signal. Also included are pattern memory means for storing different sets of pattern data each of which is representative of one of a plurality of test signals, programmable means for specifying a test signal sequence in which an order of test signal generation is designated, and means responsive to the test signal sequence for causing the pattern memory means to transfer the appropriate set of pattern data into the storing means in the sequence specified in the programmable means.

It is therefore an object of the present invention to provide a test signal generator which is capable of generating test signals having high frequency rise times.

It is another object of the present invention to provide a digital test signal generator capable of generating test signals for use in high definition television.

It is a further object of the present invention to provide a test signal generator wherein test signals are reconstructed from selected segments of the desired test signal by storing the pattern segments in memory and selectively addressing locations of the memory to read out a sequence of pattern data which represents the entire test to be generated.

These and other objectives and features of the present invention will be better understood upon consideration of the following detailed description of certain preferred embodiments of the invention and accompanying drawings.

BRIEF DESCRIPTION OF THE DRAWINGS

FIG. 3 is a table which illustrates the reconstruction of a test signal from pattern segments.

DETAILED DESCRIPTION OF THE INVENTION

Figure 1:
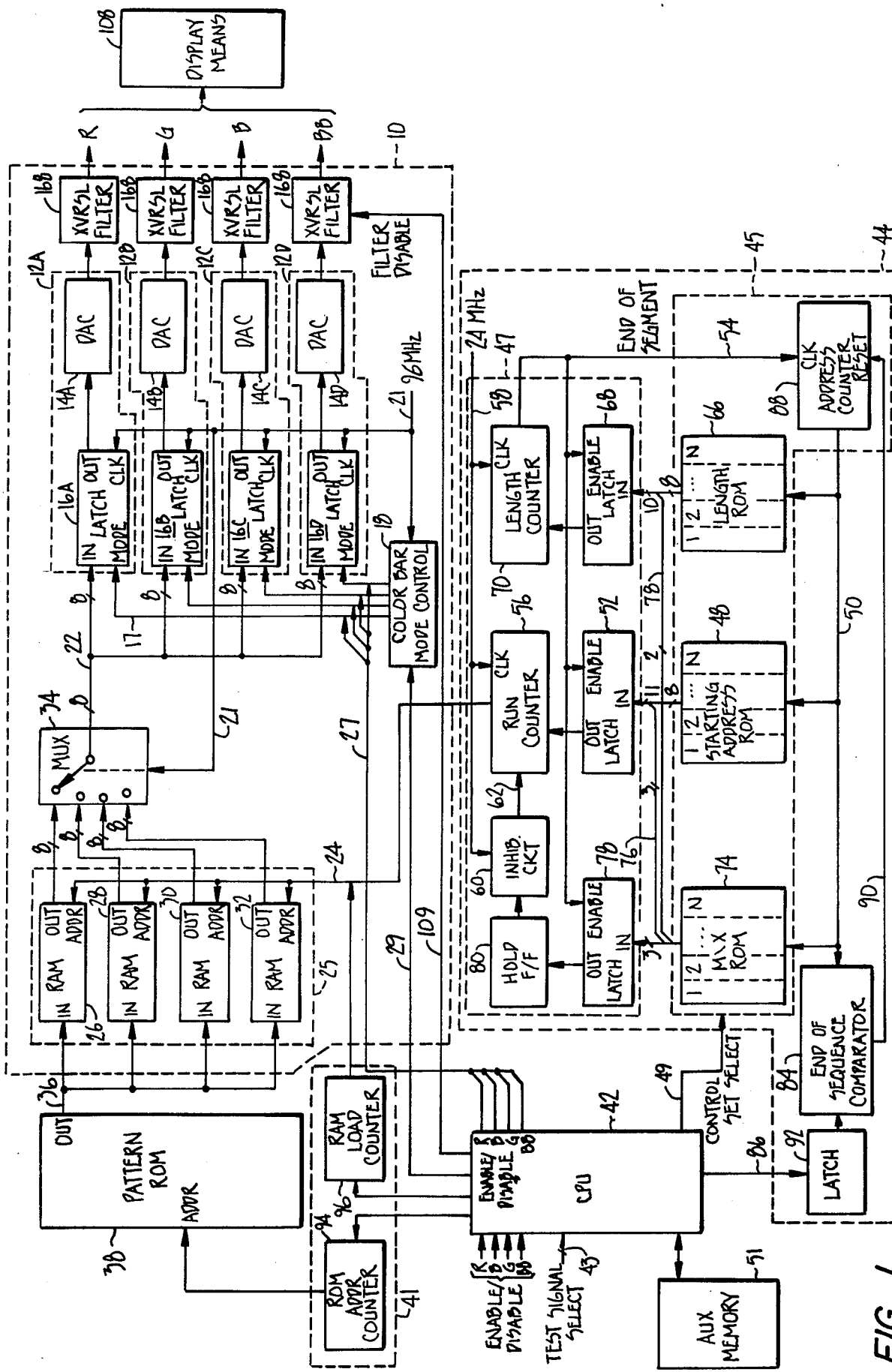
FIG. 1 is a generalized block diagram of the test signal generator of the present invention.

Referring to FIG. 1, the present invention will now be described in greater detail.

Pattern Storage

The circuitry enclosed within dotted line 10 provides addressable memory whose output is converted into analog form. Within dotted line 10, multiplexer 34, in conjunction with addressable memory 25, provides a high frequency stream of binary words on output line 22 in response to a lower speed sequence of addresses on line 24. The high speed stream of binary words on line 22 is supplied to digital to analog converter circuitry in channels 12A, 12B, 12C, and 12D for conversion into analog form.

Addressable memory 25 includes random access memories (RAMs) 26, 28, 30, and 32, which are addressed in parallel from address line 24 and provide binary word outputs. The outputs of RAMs 26, 28, 30 and 32 are each supplied to a separate input of multiplexer 34. The output of multiplexer 34 is connected to output line 22. Multiplexer 34 acts as a switch which sequentially connects each of its inputs to the output line 22 at a rate determined by the clock on line 21. Preferably, this clock is selected to be a multiple of the rate of addressing on address line 24, wherein the multiple is determined by the number of random access memories which are being addressed in parallel in addressable memory 25. In the embodiment shown in FIG. 1, this multiple is 4, since there are 4 random access memories being utilized. Thus, the clock on line 21 will be four times the address rate on line 24. Thus, it can be seen that, in the preferred embodiment, multiplexer 34 and addressable memory 25 provide a stream of binary words, at a rate 4 times as great as the rate at which addressable memory 25 is addressed.

As discussed above, the stream of binary words on output line 22 is supplied to digital to analog converter circuitry for channels 12A, 12B, 12C and 12D. Each of these digital to analog converter circuits are identical so that only one such circuit need be described herein.

In channel 12A, a latch 16A receives the stream of binary words from line 22. The latch is clocked from line 21. The output of latch 16A is supplied to digital to analog converter 14A, where it is transformed into a corresponding analog voltage level. The mode of latch 16A is controlled by a mode command, supplied from CPU 42 and color bar mode control 18 on line 17. The presence of a logic 1 level on line 17 enables latch 16A to receive and latch data from output line 22 at a rate determined by the clock on line 21. Conversely, when a logic 0 is present on line 17, latch 16A will be prevented from responding to the data present on output line 22. In this manner the contents of latch 16A can be held unchanged, they can be changed at a rate determined by the clock on line 21, or they can be changed at a rate determined by the timing of enable commands on line 17.

It is to be understood that the test signal generator embodiment illustrated in FIG. 1 is intended for use with a high definition television color monitor. Thus, separate digital to analog converter circuits 14A, 14B, 14C and 14D are provided for each of four channels, 12A, 12B, 12C and 12D, respectively, wherein these channels correspond to the red, green, blue and black burst channels of the color monitor. It is to be understood that the teaching of the present invention is equally applicable for generating test signals for a single channel or a large number of different channels.

It is also to be understood that where a test signal in binary form is acceptable, the digital to analog circuits 14A-14D can be dispensed with.

In an embodiment of the invention which is intended for use in generating test signals for high definition television, RAMs 26, 28, 30 and 32 are preferably each one kilobyte long and preferably supply one parallel byte of binary word to multiplexer 34 per address. The address rate on address line 24 is preferably 24 MHz while the clock on line 21 is preferably 96 MHz.

Pattern Segment Selection

Figure 2A:
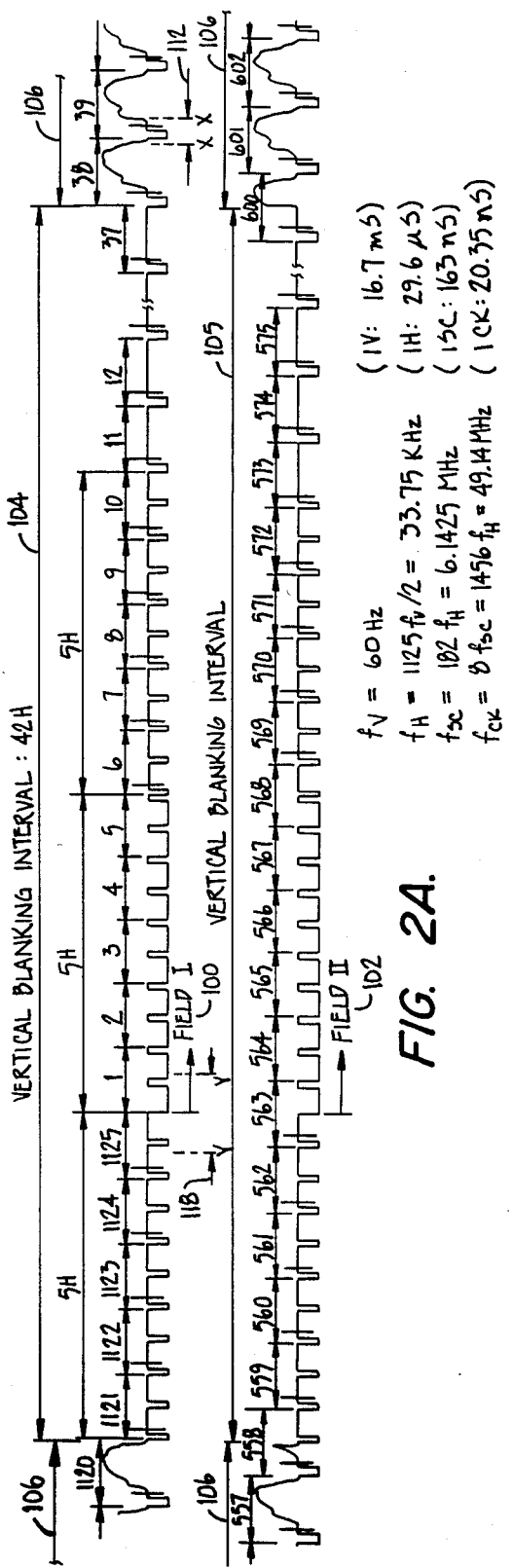
FIG. 2A illustrates a typical test signal waveform used in high definition television.

As discussed above, selected pattern data representative of portions of the test signal to be generated are stored in RAMs 26, 28 30 and 32. These segments are stored at predetermined addresses. Referring to FIG. 2A a typical test signal is illustrated. This test signal is formatted to provide sync, burst, and active video waveforms for a frame for HDTV. The frame waveform includes a first field 100 and a second field 102. On the HDTV display, the active video portions of the first and second fields, are interleaved with one another.

Each frame waveform includes two vertical blanking intervals: a first blanking interval 104 which bridges the end of the second field 102 and the beginning of the first field 100, and a second blanking interval 105 which bridges the end of the first field 100 and the beginning of the second field 102. The remainder of each field relates to the visual image to be produced, and will hereinafter be referred to as the display portion 106.

The entire frame waveform signal is typically organized into consecutive portions corresponding to the horizontal display lines. For HDTV, 1125 horizontal lines define the entire frame waveform signal.

As can be seen from FIG. 2A, the vertical blanking interval 104 is defined by lines 1121 through 1125 followed by lines 1 through 37. Similarly, the vertical blanking interval 105 is defined by lines 558 through 600. It can also be seen that the display portion 106 associated with the first field 100 is defined by lines 38 through 558 and that the display portion 106 associated with the second field 102 is defined by lines 601 through 1120.

Figure 2D:
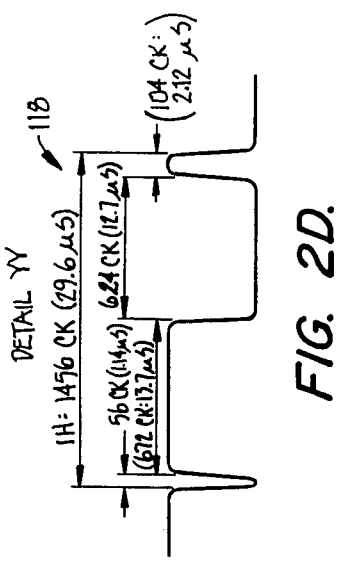
FIG. 2D is an expanded view of the waveform of FIG. 2A taken along line y—y.
Figure 2C:
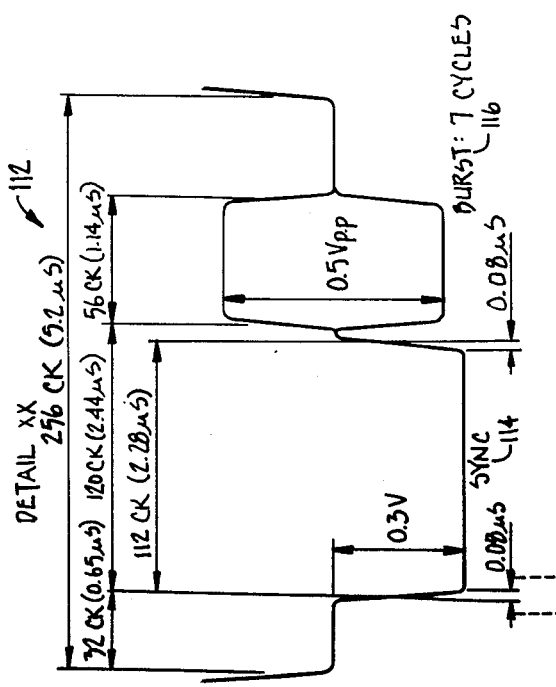
FIG. 2C is an expanded view of the waveform of FIG. 2A taken along line x—x.
Figure 2B:
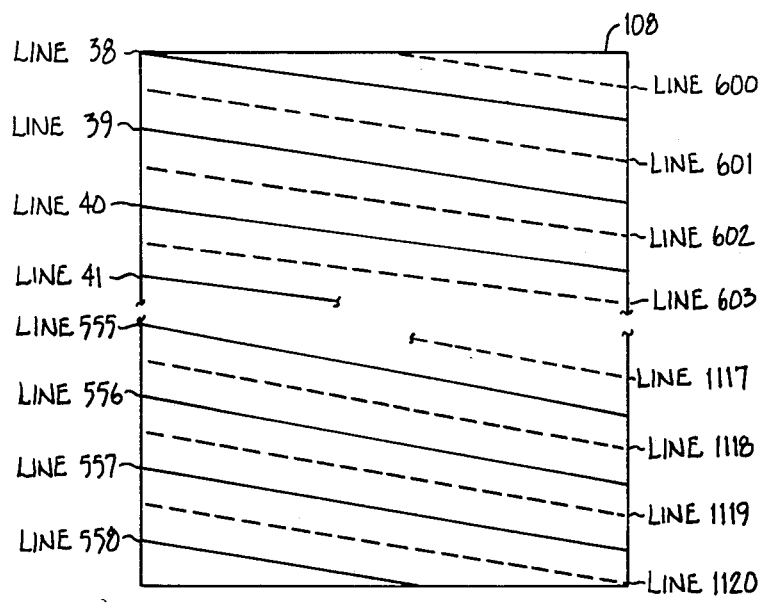
FIG. 2B illustrates the interlacing in an HDTV display of the lines from the first and second fields of a frame test signal.

FIG. 2B illustrates the relationship of the lines in the display portion of each field to the resulting visual image produced on a display screen 108. As discussed above, first field 100 is displayed first in time, while second field 102 follows directly thereafter and is interleaved with first field 100. Thus, line 38 of active video 106 is the first vertical trace which appears on screen 108, followed by lines 39, and 40 through 558 to complete the first field of the visual image. The second field of the visual image begins at the top of screen 108 with line 600 of display portion 106 for the second field 102. The next line, 601, is interleaved between lines 38 and 39, with subsequent lines 602-1120 being interleaved with corresponding lines from first field 100.

Referring to line 39 of first field 100 in FIG. 2A, the portion of line 39 which determines the visual image therefor on display screen 108 is denoted by reference numeral 110. This is called the active video portion of the line.

The remaining portion of line 39, denoted by reference number 112, is shown in greater detail in FIG. 2C. This portion of the waveform provides a horizontal sync signal, indicated by reference numeral 114, and a burst signal indicated by reference numeral 116. When used hereinafter, the terms "active video", "horizontal sync", and "burst" shall denote the corresponding portions of lines 38 through 558, and 600 through 1120 of the frame waveform.

Returning to FIG. 2A, it can be seen that lines 1121 through 1125, 6 through 37, 559 through 563, and 569 through 600 of vertical blanking invervals 104 and 105 for each of the fields, 100 and 102, all have a sync and burst portion. However, the remaining portions for each of these lines is either a constant level throughout, or a constant level including a negative going pulse. The later waveform is present in lines 1121 through 1125, and lines 6 through 10 of the vertical blanking interval 104 of the first field 100, and in lines 558 through 562 and 569 through 572 of the vertical blanking interval 105 of second field 102. A more detailed depiction of this waveform is shown in FIG. 2D. The portion shown in FIG. 2D corresponds to the interval y—y having reference designation 118 in FIG. 2A. The remainder of the vertical blanking intervals, i.e., lines 1 through 5, for first field 100 and lines 563 through 568 of second field 102 are positive going pulses. These pulses are also shown in greater detail in FIG. 2D.

For generation of the frame waveform of FIG. 2A, the pattern segment data stored in RAMs 26, 28, 30 and 32 should be definitive of all of the different wave forms found therein. It can be seen that the vertical blanking interval 104 is substantially identical to the vertical blanking interval 105. It can also be seen that for each line that contains active video, the sync and burst portions thereof are identical. Thus, the pattern segments which are selected to be representative of both vertical blanking intervals and the horizontal sync portions 112 for each display portion line can be defined by a common set of pattern segments.

With respect to the active video portion for lines 38 through 558 and lines 600 through 1120, pattern segments are selected to define each unique waveform present therein. For example, if active video portion for a given line is identical to the active video portion for all other lines, then the pattern segments stored in addressable memory 25 need only define the active video portion for one line. Similarly, if the active video portions of all lines can be defined by subsets of a set of pattern segments for a particular line, then only the set of pattern segments definitive of the particular line need be stored. Conversely, if the active video portion for each line was different, it is conceivable that selected patterns definitive of each active video portion for each line will be stored in the addressable memory 25.

The same is true for defining the pattern segments to be stored for the waveforms in the vertical blanking intervals 104 and 105.

In the above manner, where a particular wave form can be defined as a subset of another waveform, pattern segment data definitive of the latter pattern can be stored in memory. The former pattern then can be generated by utilizing a subset of the stored pattern segment data. Where there are portions unique to each different waveform, each such portion should be defined and stored in memory in addition to the common portions.

For example, referring to FIG. 2A, it can be seen that there is a substantial amount of similarity between line 6 and line 11. In order to define both lines, data would be stored in memory which define the falling edge and rising edge of the horizontal sync portion of the wave forms and which defined the burst portion of the wave forms. Additionally, data defining the fall and rise time of the negative going pulse in waveform 6, which follows the burst portion, would also be selected and defined. Thus, in the generation of line 6, all of the stored data would be addressed. On the other hand, when generating line 11, all of the stored data for line 6, except for that defining the negative going pulse, would be utilized. It can be seen that, by appropriate selection of the pattern segments, the amount of data which is required to reside in addressable memory 25 is minimized.

In the present invention, data which is representative of selected portions of the waveform of FIG. 2A are stored at predetermined addresses within the random access memories 26 through 32. As explained in greater detail below, the circuitry within dotted line 44, of FIG. 1, supplies addresses on line 24 to RAMs 26 through 32 to read the appropriate data from the memory in a predetermined sequence which includes repetitive addressing of certain selected locations in the memory, or the repetition of addressing of certain sequences of locations in order to construct the frame waveform pattern from the selected data pattern stored in memory.

The manner in which the addressing from circuitry 44 is accomplished will now be described in greater detail with reference to the FIGS. 1, 2A and 3.

Addressing of Pattern Storage

The control circuitry 45 supplies starting address data, sequence length data, and hold commands to address generating circuitry 47. Address generating circuitry 47, in response to the data from control circuitry 45, generates the sequence of addresses which are supplied to addressable memory 25 on address line 24. In the preferred embodiment of the present invention, control circuitry 45 includes a starting address read only memory (ROM), 48, a length ROM, 66, and a mix ROM 74. These control ROMs are read out according to addresses supplied on line 50 from an address counter 88. Address counter 88 is a sequential counter which counts from 0 and is incremented with each pulse received on line 54 from the address generating circuitry 47.

Control ROMs

Starting address ROM 48, length ROM 66 and mix ROM 74 are addressed in common. For each address supplied to it by address counter 88, starting address ROM 48 supplies a sequence of starting addresses, wherein each starting address represents the location in addressable memory 25 at which the data for the selected pattern segment begins. The order in which the starting addresses are supplied from starting address ROM 48 specifies the order in which each of the segments are read from addressable memory 25. In turn, the starting address order determines the order in which the segments are assembled to construct the particular test signal being generated.

Length ROM 66 supplies segment length data which is correlated to each starting address. The segment length data indicates the number of addresses which are to be generated from the corresponding starting address being supplied from starting address ROM 48.

Mix ROM 74 supplies hold commands, as well as additional bits to complete the starting address data from starting ROM 48 and the segment length data from length ROM 66. As with the length ROM 66, the mix ROM 74 is addressed in common with starting address ROM 48. Thus, the address generating circuitry 47 receives hold commands from mix ROM 74 which are associated with the current starting address. From FIG. 1 it can be seen that the mix ROM 74 supplies three additional bits of data on line 76 to supplement the starting address being supplied by starting address ROM 48. Also, it can be seen that mix ROM 74 supplies two additional bits on line 78 to the segment length data supplied by length ROM 66.

In operation, control circuitry 45 supplies a sequence of starting addresses, and segment length data and hold commands which are correlated to the starting address data, to be used to control the generation of addresses in address generation circuitry 47.

Address generation circuitry 47 includes a presettable run counter 56 and an associated latch 52. Latch 52 receives the starting address data from starting address ROM 48 and provides the data to run counter 56. Also included is a length counter 70 and an associated latch 68. Latch 68 receives the segment length data from length ROM 66 and provides the data to length counter 70. Latch 78, receives the hold commands from mix ROM 74, and supplies the commands to hold flip flop 80.

Presettable run counter 56 is incremented from the starting address stored in latch 52 according to a clock supplied on line 58. Length counter 70 maintains a running count of the number of clock pulses on line 58 which occur after the receipt of the current starting address and segment length data. When the running count in length counter 70 reaches the quantity which corresponds to the segment length data stored in latch 68, segment length counter 70 provides an end of segment pulse on line 54. Line 54 is connected to the enable input of latch 68, latch 52, and latch 78 and to the clock input of address counter 88.

When the end of segment pulse appears on line 54, address counter 88 is incremented to the next address in order. Simultaneously, latches 52, 68, and 78 are enabled to receive the starting address data, segment length data, and hold command data, respectively, which are then present at their inputs. Thus, as address counter 88 is being incremented to the next address, latches 52, 68 and 78 are receiving and storing the data from the ROMs which correspond to the previous address supplied to the ROMs from address counter 88.

By the selection of the segment length data supplied with each starting address, the pattern segment data stored in addressable memory 25 can be used in whole or in part, depending upon what portion of the pattern segment is required to generate the particular portion of the test signal.

The hold command from mix ROM 74 is received by hold flip-flop 80, via latch 78, which, in turn, causes inhibit circuit 60 to provide a count inhibit signal on line 62 to run counter 56. As long as the count inhibit signal is present on line 62, the count in run counter 56 will be held at the current count. Inhibit circuitry 60 is updated in accordance with the clock on line 58. This is to ensure that the presence or absence of a hold command is processed by the inhibit circuit 60 in synchronism with the count in the run counter 56 and the segment length counter 70.

From the above discussion it is to be appreciated that the order in which the starting addresses are arranged in starting address ROM 48 specifies the order in which the pattern segments from addressable random access memories 26 through 32, are to be assembled into the test signal being generated. It is also to be understood that the segment length data supplied by length ROM 66 specifies what portions of the pattern segments corresponding to each starting address are to be used in the generation of the particular test signal. Finally, it is to be understood that the presence of a hold command in conjunction with a particular starting address will cause the same location in addressable memory 25 to be addressed for the duration of the segment length. Thus, when a hold command is present, a constant magnitude will be provided in the test signal being generated over a period specified by the segment length data from length ROM 66.

Operation of Pattern Storage and Addressing Circuitry

In operation, the circuitry enclosed within dotted lines 10 stores data which are representative of pattern segments which segments are in turn representative of an entire frame or waveform. Circuitry 10 is addressed via line 24 by a series of addresses which are selected, ordered, and repeated so that data are recalled from addressable memory 25 and assembled into a sequence of data, which sequence defines the entire test signal being generated. The sequence of data is then converted by the circuitry 10 into an analog format.

Referring to FIG. 3, an illustrative example of this process will now be discussed. Column 120 represents the addresses emerging from address counter 88. Column 122 represents the starting addresses supplied by starting address ROM 48 to run counter 56. Column 124 represents the segment length data supplied by length ROM 66 to length counter 70. Column 126 indicates whether a hold command is supplied by mix ROM 74 in conjunction with a particular starting address. Finally, column 128 indicates the pattern segment which will be constructed from the series of addresses generated from a particular starting address, segment length, and hold command.

In this example, the generation of lines 1, 6, and 39 of FIG. 2A are selected for illustration. Assume for purposes of this illustration that the data for the selected pattern segments are found in RAMs 26 through 32 at the starting addresses indicated in column 122. Referring to FIGS. 2A, 2C, and 3, it can be seen that the first pattern segment which is required to be generated for line 1 is the left-most falling edge of the sync portion 114.

Assume, for purposes of this illustration that the starting address of the data corresponding to this falling edge is found at address 0 in RAMs 26 through 32. In the generation of the entire frame waveform, line 1 will be the first line to be generated. Thus the address counter 88 will be initially reset to zero and the first address supplied by address counter 88 is 0. In response to this address, starting address ROM 48 provides a 0 starting address to run counter 56. Similarly, length ROM 60 supplies a segment length data of four to length counter 70. From column 126, it can be seen that there is no hold command issued for this starting address. In response to the 0 starting address run counter 56 will begin counting from 0 for four counts before being reset by an end of segment pulse from length counter 70. Thus, a set of four addresses will be generated by this set of control data.

In response to this series of four addresses, random access memories 26 through 32 will provide four sequential sets of four binary words apiece. Multiplexer 34 will convert these four sequential sets into a serial stream of 16 binary words. Digital to analog converting circuitry 14A, 14B, 14C and 14D will convert each word, as it is received in the serial sequence, address counter 88 to a next address, which is 1, and to enable latches 52, 68, and 78 to receive the next starting address, segment length data, and hold command. From FIGS. 2A and 2C, it can be seen that the next segment of the test signal to be generated is a constant level. Thus, the starting address stored at address 1 in starting address ROM 48 corresponds to a location which contains data representative of the desired level. The segment length data provided by length ROM 66 in response to address 1, corresponds to the duration of that constant level in FIG. 2C. Thus, the segment length data will be some large number, such as 1270 shown in column 124. Because there is no variation in level for this particular portion of the signal being generated, there is no need to access any other locations in RAMs 26 through 32 during this time. Thus, there is a hold command issued in conjunction with this starting address, as is indicated in column 126 in FIG. 3. The resulting pattern is shown in column 128 as a constant level.

The generation of the remainder of line 1 continues in a similar manner with starting address ROM 48 supplying other starting addresses in the series. The length ROM 66 provides data which indicates the duration for each segment, while hold command designates whether the starting address is to be incremented by the run counter 56, or held constant thereby.

Examples for the generation of line 6 and line 39 in FIG. 2A are also provided in FIG. 3. Note that by the time line 6 has been reached, address counter 88 has been incremented to address 39. Noteworthy in the generation of line 6 is the address sequence associated with address 42 from address counter 88. Located at this address in starting address ROM 48 is the location in RAMS 26 through 32 of the burst signal. As shown in the example for line 6, the entire burst signal is stored in random access memory starting at address 17. The segment length data which is designated for this sequence is therefore of a magnitude which would permit the entire sequence to be read from random access memory. Note that there is no hold command present for this address.

Noteworthy in the generation of line 39 is the information supplied from starting address ROM 48, length ROM 66, and mix ROM 74 in response to the address "e" from address counter 88. This is because the starting address stored at address "e" in starting address ROM 48 is the location of the active video portion for line 39. In the example shown in FIG. 3, the entire data in RAMs 26 through 32 for the active video portion of line 39 is read out therefrom.

Figure 7:
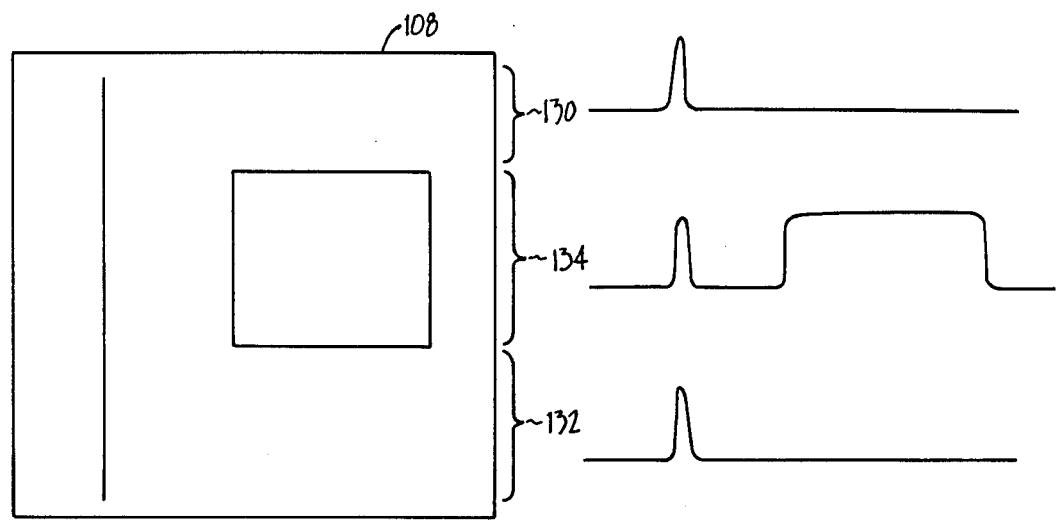
FIG. 7 illustrates the active video portion of a test signal for generating a bar-window pattern on an HDTV display.

FIG. 7 illustrates the use of a subset of a set of pattern segment data descriptive of one waveform to generate a related waveform. Illustrated therein is a standard pulse-window test image. Shown to the right of the image are the active video portions which are required to generate the associated portions of the image. As shown in the Figure, portion 130, which has only a vertical bar, is generated by lines having an active video portion that has a short pulse occurring toward the beginning of the waveform. The same is true for image portion 132. However, the image portion 134 requires an active video waveform which has the short pulse of the previous waveforms, but also a pulse of substantial duration toward the middle of the waveform.

In order to generate the visual image of FIG. 7, only pattern segments representative of the active video waveforms for portion 134 need to be stored in addressable memory 26 through 32. Specifically, pattern segments would be stored which define the short pulse and the rising and falling edges of the long pulse. Thereafter, when generating the active video waveforms for portions 130 and 132 of the visual image in FIG. 7, the addressable memory 25 will be accessed so that only the data corresponding to the pattern segments defining the short pulse for portion 134 will be read out of the addressable memory 25. In order to generate the active video waveforms for portion 134, the pattern segment data for both the short pulse and the long pulse will be read out from addressable memory 25. Thus, it can be seen that data representative of the entire test signal to be generated need not be stored in addressable memory.

Figure 4:
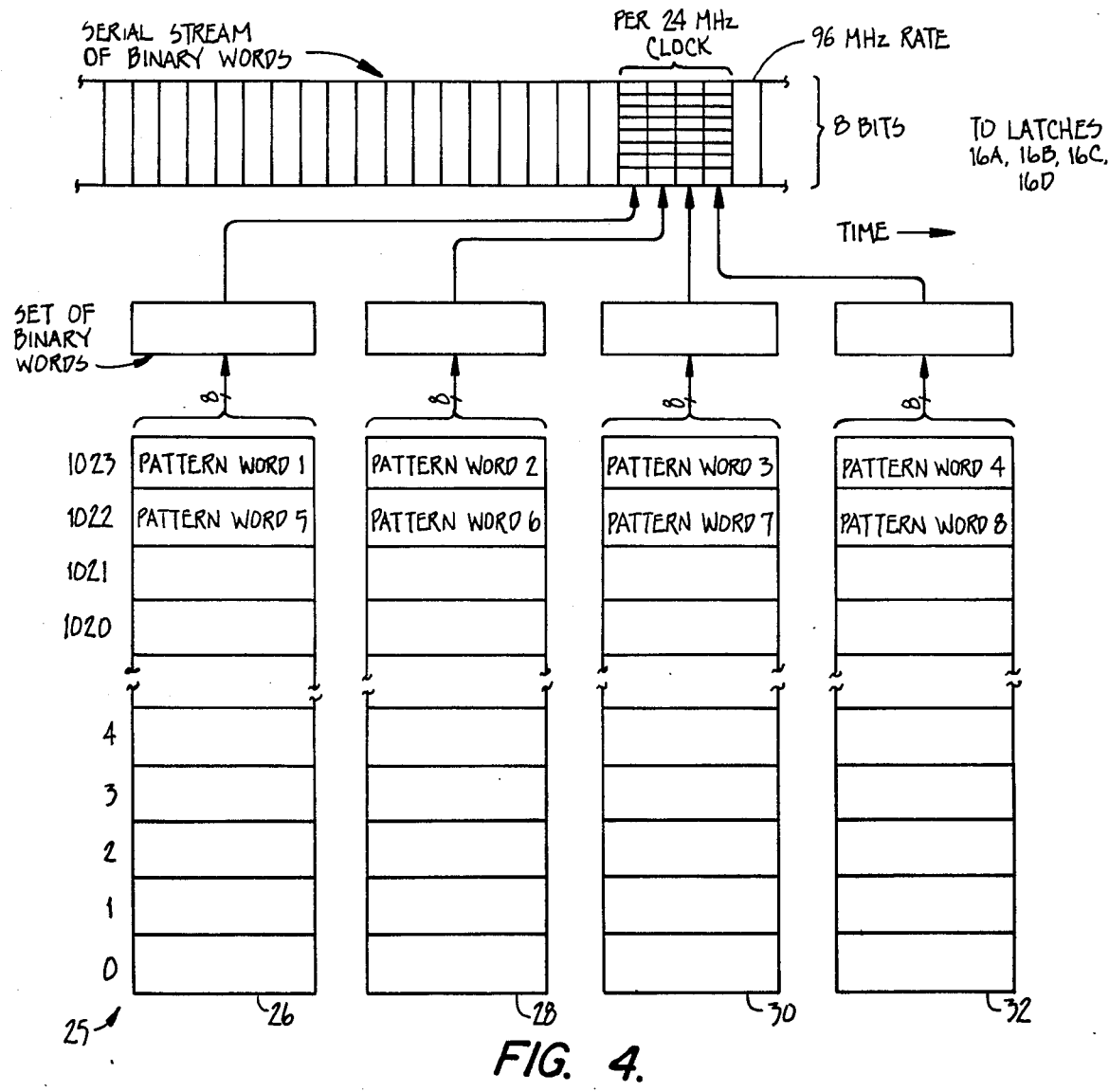
FIG. 4 illustrates the transformation of sets of binary words from addressable memory into a high speed serial stream of binary words.

FIG. 4 is illustrative of the manner in which data representative of pattern segments are retrieved from the RAMs 26 through 32 and assembled into a serial stream of binary words by multiplexer 34. In the preferred embodiment of the invention, RAMs 26 through 32 each supplies an eight bit word when addressed. Thus, for each address supplied on address line 24, four binary words of eight bits apiece, are supplied to multiplexer 34. As discussed above, addresses on address line 24 are supplied at a 24 MHz rate while the multiplexer 34 is operated at a 96 MHz rate. At such a rate, the multiplexer has sufficient time to sequentially connect each of its inputs to its output to assemble the four binary words into a serial stream of binary words eight bits wide and occurring at a 96 MHz rate. This serial stream of binary words is supplied on line 22 to digital to analog converters 14A, 14B, 14C and 14D via latches 16A, 16B, 16C and 16D respectively. In the embodiment discussed above, each digital to analog converter means is responsive to all of the binary words in the serial data stream. Binary words are therefore supplied to each digital to analog converter at a 96 MHz rate.

Again, referring to FIG. 4, it can be seen that the data for each pattern segment are distributed among addressable memories 26, 28, 30, and 32 so that the smallest typical pattern segment which can be defined will be four binary words long. This represents a time interval of approximately 41 nanoseconds when a multiplexer clock of 96 MHz is used.

As discussed above, the typical waveform for an HDTV test signal, as shown in FIG. 2A, has portions which can be classified as vertical blanking intervals, horizontal synchronization intervals, and active video. For substantially all of the test signal waveforms for HDTV, the vertical blanking interval and the horizontal sync intervals are identical. Only the active video portions thereof change from test signal to test signal. This further reduces the amount of data which must be changed in RAMs 26 through 32 when a test signal having a different active video portion is sought to be generated. As such, only the locations which contain data corresponding to the active video portions for the test signal need be modified. The locations containing data corresponding to pattern segments for the vertical blanking interval on the horizontal sync interval can remain as-is.

Dynamic Pattern Changing

A further feature of the present invention is that of dynamic pattern changing so that test signals can be generated whereby the pattern displayed on an HDTV monitor can be made to automatically vary from frame to frame, without any noticeable distortion or interruption of the visual image in any one frame.

In order to accomplish this, a pattern ROM 38, FIG. 1, is provided which contains data for pattern segments which define the vertical blanking interval, the horizontal sync interval, as well as the various active video patterns for the various test signals desired to be generated. For example, pattern ROM 38 can contain data for a flat field visual display, a pulse window visual display, a cross hatch visual display, or a color bar visual display, among others.

Figure 8:
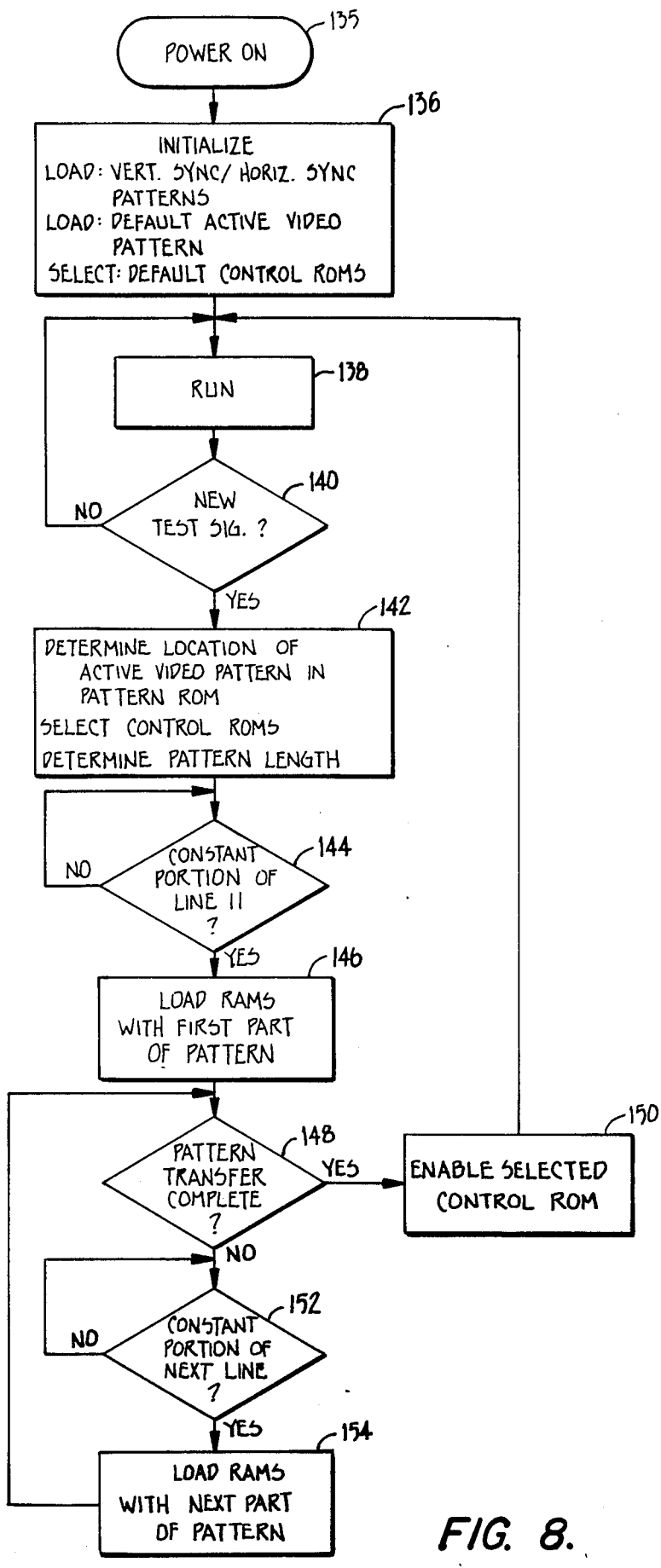
FIG. 8 is a flow diagram which describes the transfer of pattern segments into memory.

FIG. 8 illustrates dynamic pattern changing. Upon initial power-up step 135 of the test signal generator, central processing unit 42 provides instructions to RAM load counter 96 and ROM address counter pattern load circuitry 41, which include 94, to cause the vertical blanking interval data and the horizontal sync interval data to be loaded into designated locations in RAMs 26 through 32, step and 136. Thereafter, the data in these locations need not be modified. Also upon initial power-up of the test signal generator, data for pattern segments corresponding to the active video portions of a default test signal can be loaded from pattern ROM 38 into predetermined locations of RAMs 26 through 32, step 136.

During this loading operation, CPU 42 supplies addresses to ROM address counter 94 which designate the location in pattern ROM 38 of the particular pattern segments to be loaded into RAMs 26 through 32. The CPU 42 also provides the starting address to RAM load counter 96, which designates the location in RAMs 26 through 32 at which the particular pattern segments are to be stored. Thereafter, when it is desired to change the active video portion of the test signal, CPU 42 supplies the appropriate instructions and addresses to ROM address counter 94 and RAM load counter 96 to cause the appropriate active video segment to be read from pattern ROM 38 to RAMs 26 through 32, as discussed above.

In order to provide dynamic pattern changing, this transfer of active video data from pattern ROM 38 to RAMs 26 through 32 is accomplished during the generation of a selected portion of the vertical blanking interval of the test signal. Preferably, active video pattern data are transferred during the generation of lines 11 through 37 of the vertical blanking interval shown in FIG. 2A. As can be seen from the waveform for line 11, for example, there is a horizontal sync portion followed by a burst portion and then a relatively long period of a constant level. It is during this relatively long period that a portion of the data is transferred between pattern ROM 38 and RAMs 26 through 32. The transfer of the remaining portions can occur during each of the constant level portions in lines 12 through 37. For the typical active video pattern, complete transfer of the data can occur well before line 37.

The data transfer is selected to occur at this point in the generation of the test signal waveform because no level transition is required here. Hence, once the data required to produce such a level are loaded in the latches 16A, 16B, 16C and 16D, the latches can be disabled for the duration of the constant level section. During this disable time, the data transfer can be accomplished without disturbing the data within the latches and thus the outputs of digital to analog converters 14A, 14B, 14C and 14D. Additionally, during this time, a hold command can be supplied from mix ROM 74 via latch 78, hold flip-flop 80 and inhibit circuit 60 to run counter 56 to disable run counter 56 so that RAM load counter 96 supplies the addressing to RAMs 26 through 32. Upon the completion of the constant level segment for the particular line, the latches 16A, 16B, 16C and 16D can be enabled to receive the next set of binary words for conversion into the horizontal sync and burst portions for the next line.

It is to be understood that the starting address data, segment length data, and hold commands supplied by control ROMs 45, which data correspond to the active video portion of a test signal, will differ from test signal to test signal. This can be appreciated upon considering that the number of pattern segments which are required to define a particular active video segment differs from test signal to test signal and with test signal complexity. For example, the number of pattern segments required to define an active video signal having only two levels is much smaller than that required to define an active video signal which is constantly changing in level. Thus, when a different test signal is sought to be generated a different set of starting address, length and mix ROMs are used which new set corresponds to the new test signal being generated. This is in addition to the loading of the corresponding set of pattern segment data into addressable memory 25.

Typically, a plurality of sets of starting address ROMs, segment length ROMs and mix ROMs are provided, with each set corresponding to a particular test signal. These ROMs are arranged in a bank and selectively enabled by CPU 42.

The CPU 42 receives instruction from the user via a test signal select line 43. In response to the instructions, the CPU provides the required information to pattern load circuit 41 to transfer the proper active video data from pattern ROM 38 to RAMs 26 through 32. The CPU also enables the appropriate set of control ROMs 45 to be responsive to the addresses supplied from address counter 88.

Additionally, CPU 42 provides a quantity which indicates the number of pattern segments required to reconstruct and generate the desired test signal. This quantity is related to the number of starting addresses which is required to be supplied by starting address ROM 48 to designate all of the segments which are necessary to completely define the desired test signal. In turn, the number of starting addresses is related to the number of addresses which are required to be issued from address counter 88 in order to read out all of the required starting addresses from starting address ROM 48. The emd of sequence comparator 84 compares the quantity stored in latch 92 to the current count from address counter 88. When the quantities match, the end of the test signal is indicated. The end of sequence comparator 84 then issues a reset to 0 command to address counter 88 on line 90. Address counter 88 is thereby caused to start counting from 0 to repeat the generation of the test signal.

Referring to FIG. 8, in operation, a test signal select command is supplied on line 43 to CPU 42, step 140. CPU 42 determines the location of the corresponding active video portion in pattern ROM 38 for the selected test signal and supplies appropriate instructions to ROM Address Counter 94, and to RAM load counter 96. CPU 42 also determines which sets of the control ROMs 45 corresponds to the selected test signal, and provides an enable signal on control set select line 49 to enable the appropriate set of ROMs. CPU 42 also supplies pattern length data on line 86 to latch 92 to control the repetition of the test signal pattern, step 142.

It is to be understood that, for each set of control ROM, i.e. starting address ROM, segment length ROM, and mix ROM, the data corresponding to the vertical blanking interval of the test signal is stored in the same location from set to set. Thus, even though a different set of control ROMs takes over control of the signal generation when a new test signal is selected there is no discernible variation in the starting address data, segment length data, and hold commands produced by the newly enabled set of control ROM.

Continuing with the description of the operation of the present invention, once the active video pattern is located in the pattern ROM, the control ROM is selected, and the pattern length is determined in step 142, CPU 42 determines whether the constant portion of line 11 in the vertical blanking interval is currently being generated, step 144. When such a point is reached, the CPU 42, in step 146, disables the latches 16A, 16B, 16C and 16D, disables run counter 56, and loads addressable memory 26 through 32 with the first part of the pattern, step 146. In step 148, the CPU 42 determines whether the entire pattern has been transferred. If such is the case, the CPU 42, in step 150, enables the newly selected control ROM and returns to run step 138 to generate the new test signal.

If, on the other hand, the pattern transfer is not completed in step 148, the CPU returns control to control ROMs 45 and proceeds to step 152 in which it looks for the constant portion of the next line. When that portion is reached, the CPU takes control of addressable memory 25 and proceeds to step 154 in which the next part of the pattern is loaded into RAMs 26 through 32. Again, during this step, the latches 16A, 16B, 16C and 16D are disabled and run counter 56 is disabled to permit the transfer of data from pattern ROM 38 to RAMs 26 through 32. When step 154 is completed, CPU 42 returns to step 148 to again determine whether the pattern transfer is complete. If not, CPU 42 loops through steps 152 and 154 until the pattern transfer is completed. As discussed above, for the typical test signal, the pattern transfer is completed well before line 37 of the vertical blanking interval is reached.

During execution of run step 138 in FIG. 8, the test signals are generated as previously discussed.

In one embodiment of the present invention, latches 16A, 16B, 16C, and 16D associated with digital to analog converters 14A, 14B, 14C, and 14D, respectively, are controlled by CPU 42 to be responsive to each of the binary words in the serial stream of binary words from multiplexer 34. Each digital to analog converter 14A, 14B, 14C, and 14D therefore receive the same binary data from the associated latches and therefore provide the identical analog output levels. This automatic test signal sequence mode permits the generation of such test signals as "bounce," wherein the active video portion of the frame waveform is alternated between two different test patterns so that the visual image produced on the HDTV display 108 bounces back and forth between the two patterns on a frame basis. If a pin-cushion/cross-hatch pattern were desired, the bounce mode could be employed to display a cross-hatch for one frame and then the pin-cushion dot array for the next frame. Thus the alternating back and forth between the pin cushion and the cross-hatch images would produce the pin-cushion/cross-hatch pattern.

From the above discussion, it can be seen that the present invention is well suited for dynamically generating a series of different test signals, especially those signals for use in testing high definition television. For example, an auxiliary memory 51 can be connected to CPU 42 wherein the auxiliary memory is utilized by CPU 42 to store a sequence of test signals which has been selected by the user via test signal select line 43. Thereafter, the CPU 42 can be placed in run mode whereby the CPU automatically accesses the selected test sequence stored in auxiliary memory 51 to select the pattern to be loaded from pattern ROM 38 into addressable memory 25 and to select the associated control ROMs via line 49. The CPU will then permit the selected test signal to be displayed for a predetermined period of time, and then again access auxiliary memory 51 for the next test signal to be displayed, thereafter repeating the transfer from pattern memory 38 to addressable ROM 25 and the control set selection on line 49, to eventually display all of the selected test signals in the sequence designated by the user.

To this point in the discussion, it has be assumed that CPU 42 has provided the appropriate mode control signals to latches 16A, 16B, 16C, and 16D, via control line 27, such that each of said latches is responsive to every binary word in the serial stream of binary words from multiplexer 34. In another embodiment of the present invention, color bar mode control circuitry 18 is enabled, via line 29, from CPU 42, to sequentially enable latches 16A, 16B, 16C, and 16D so that said latches are responsive only to binary words occupying a selected position in the serial stream of binary words from multiplexer 34. The reason for this will become apparent after considering the following discussion.

Unlike the generation of the previous test signals discussed, each of the channels 12A, 12B, 12C, and 12D will produce a different active video signal when a color bar test signal is being generated.

Figure 9:
FIG. 9 illustrates the active video portion of a test signal for generating a color bar pattern.
Figure 9:
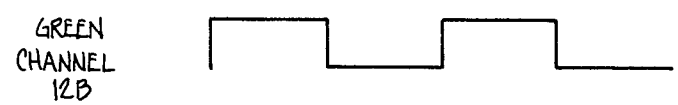
Figure 9:
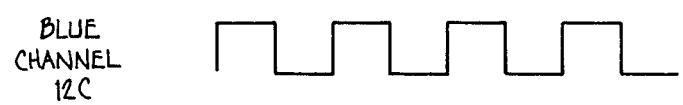
Figure 9:
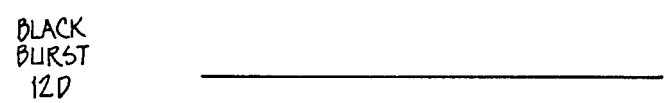

Referring to FIG. 9, an example of suitable active video patterns for each channel for a color bar test signal are illustrated. The active video signal for each channel is selected to vary with respect to the active video signal in the other channels so that vertical bars are provided each having a different color. The colors produced represents a series of possible combinations of equal intensities of red, green and blue.

As can be seen from the figure, the active video pattern for the blue channel varies at twice the rate of that for the green channel. Similarly, the waveform for the green channel varies at twice the rate of the red channel.

In order to generate different active video signals for each of the channels, the color bar active video patterns are transferred from pattern ROM 38 to addressable memory 25 so that the active video pattern for the red channel, 12A, resides wholly within RAM memory 26, the active video pattern for green channel, 12B, resides wholly within addressable memory 28, the active video pattern for blue channel, 12C, resides wholly in addressable memory 30, and so that the active video pattern for black burst channel 12D resides wholly in addressable memory 32. Thus, as addressable memory 25 is addressed, and the resulting set of binary words is transformed into a serial stream of binary words by multiplexer 34, the binary word residing in the first position of the stream represents data for the red channel, the binary word residing in the second channel in the stream respresents the data for the green channel, the binary word residing in the third position in the serial stream represents the data for the blue channel, and, finally, the data residing in the fourth position in the stream represents the data for the black burst channel.

As indicated above, color bar mode control circuit 18 is enabled during color bar generation. This circuit sequentially enables latches 16A, 16B, 16C, and 16D so that each latch is responsive to the binary word occupying a specific position in the serial stream of binary words. Thus, mode control circuit 18 preferably enables latch 16A so that it is responsive to the binary word occupying the first position of the serial stream of binary words produced by multiplexer 34 in response to each set of binary words supplied by addressable memory 25 for each address on address line 24. Similarly, mode control circuit 18 preferably enables latch 16B to be responsive only to binary words occupying the second position in the serial stream of binary words from multiplexer 34, and so forth for the latches 16C and 16D.

In the preferred embodiment of the present invention, mode control circuit 18 is a four bit ring counter which is incremented according to a 96 MHz clock supplied on line 21. As shown in FIG. 1, each of the four bit positions within the ring counter is associated with one of the latches 16A, 16B, 16C, and 16D. As a ring counter, the mode control circuit 18 circulates a single bit through each of the bit positions at the clock rate. Thus, latch 16A receives an enable signal once every four clock cycles of the 96 MHz clock. The same is true for latch 16B, except that the enable signal arrives displaced in time by one clock pulse from the enable signal for latch 16A. It is to be noted that each address appearing on line 24 and supplied to addressable memory 25 occurs at a 24 MHz rate. This is exactly the rate at which each latch 16A, 16B, 16C, and 16D receives an enable signal from mode control circuit 18.

Figure 10:
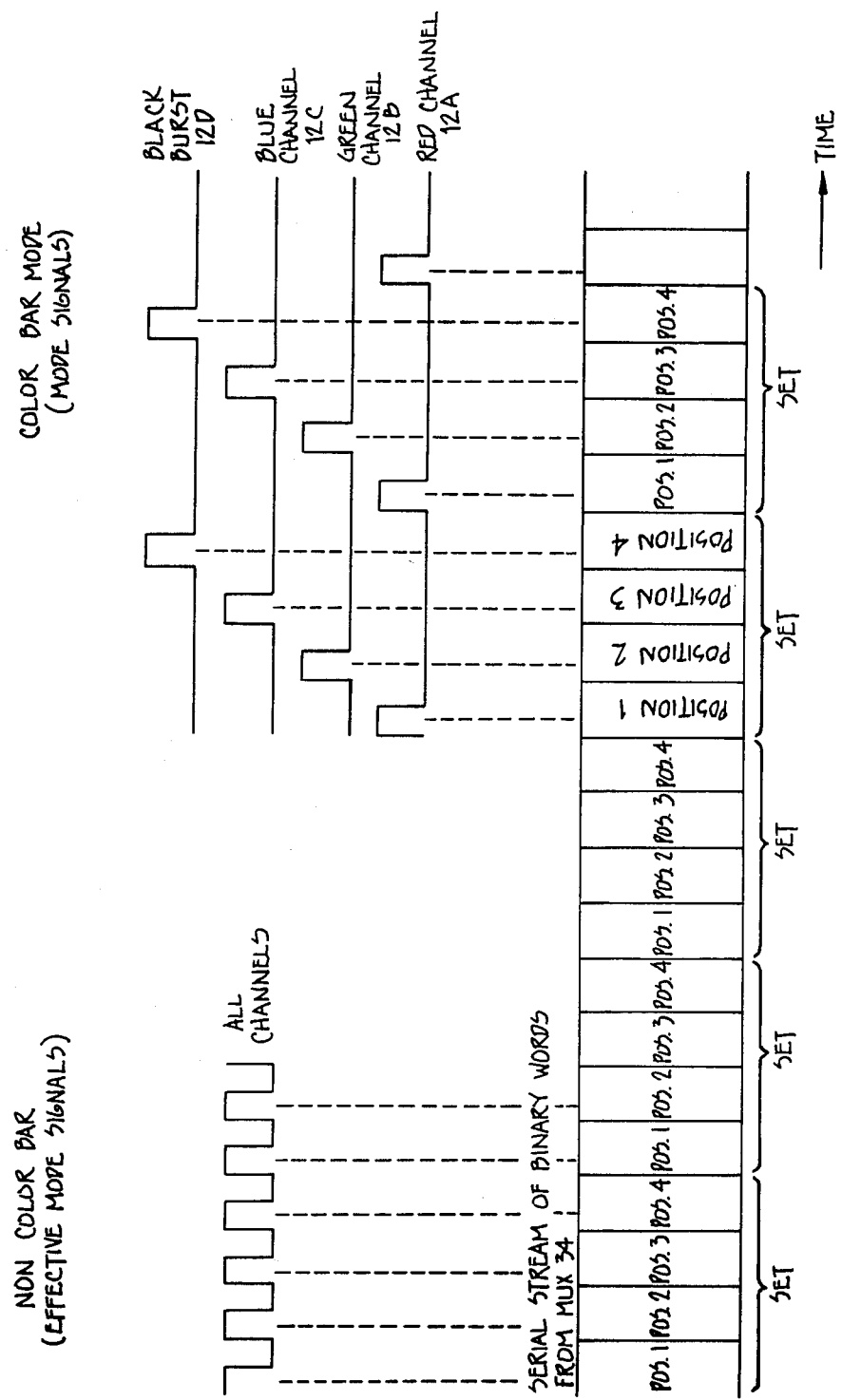
FIG. 10 illustrates the difference in allocation of the binary words in the serial stream of binary words among the output channels for the color bar mode and non-color bar modes.

The difference in the mode control signals to latches 16A, 16B, 16C, and 16D in color bar and noncolor bar mode can be appreciated upon consideration of FIG. 10. At the left of FIG. 10, the mode signals for non color bar test signals are shown, while on the right side of FIG. 10, the mode signals for color bar test signals are shown. With respect to the non color bar mode signals, all channels receive an enable pulse for each binary word in the serial stream of binary words from multiplexer 34. Conversely, latch 16A for red channel 12A receives an enable pulse which permits it to respond to the binary word occupying position 1 in each set of binary words from addressable memory 25. Similarly, latch 16B for green channel 12B is enabled to receive the binary word occupying position 2 in each set of binary words in the serial stream. In the above manner, data from RAM 26 can be transferred only to red channel 12A, data from RAM 28 can be transferred only to green channel 12B, data from RAM 30 can be transferred only to blue channel 12C, and data from RAM 32 can be transferred only to black burst channel 12D. In this manner, a different test signal for each of the output channels can be generated.

From the above, it is apparent that in the color bar mode, there will be fewer binary words provided over a given time period for defining the test signal. In the preferred embodiment, where addresses are suppled on address line 24 to addressable memory 25 at a 24 MHz rate, the test signals generated for each channel will likewise be defined by binary words supplied at a 24 MHz rate. As such, the test signals generated by the present invention for the color bar mode will contain a 24 MHz ripple, or sampling component therein. In the typical high definition television display, the active video portion rise times are required to correspond to a bandwidth of at least 27 MHz. The 24 MHz sampling component will thus cause some degradation in the actual visual image produced.

Transversal Filter

In order to eliminate such effects, another feature of the present invention is to include a unique transversal filter circuit 168 in each of the output channels, wherein the transversal filters operate during the color bar test signal generation mode. These transversal filters are designed to null-out the 24 MHz sampling component with linear phase.

Figure 6:
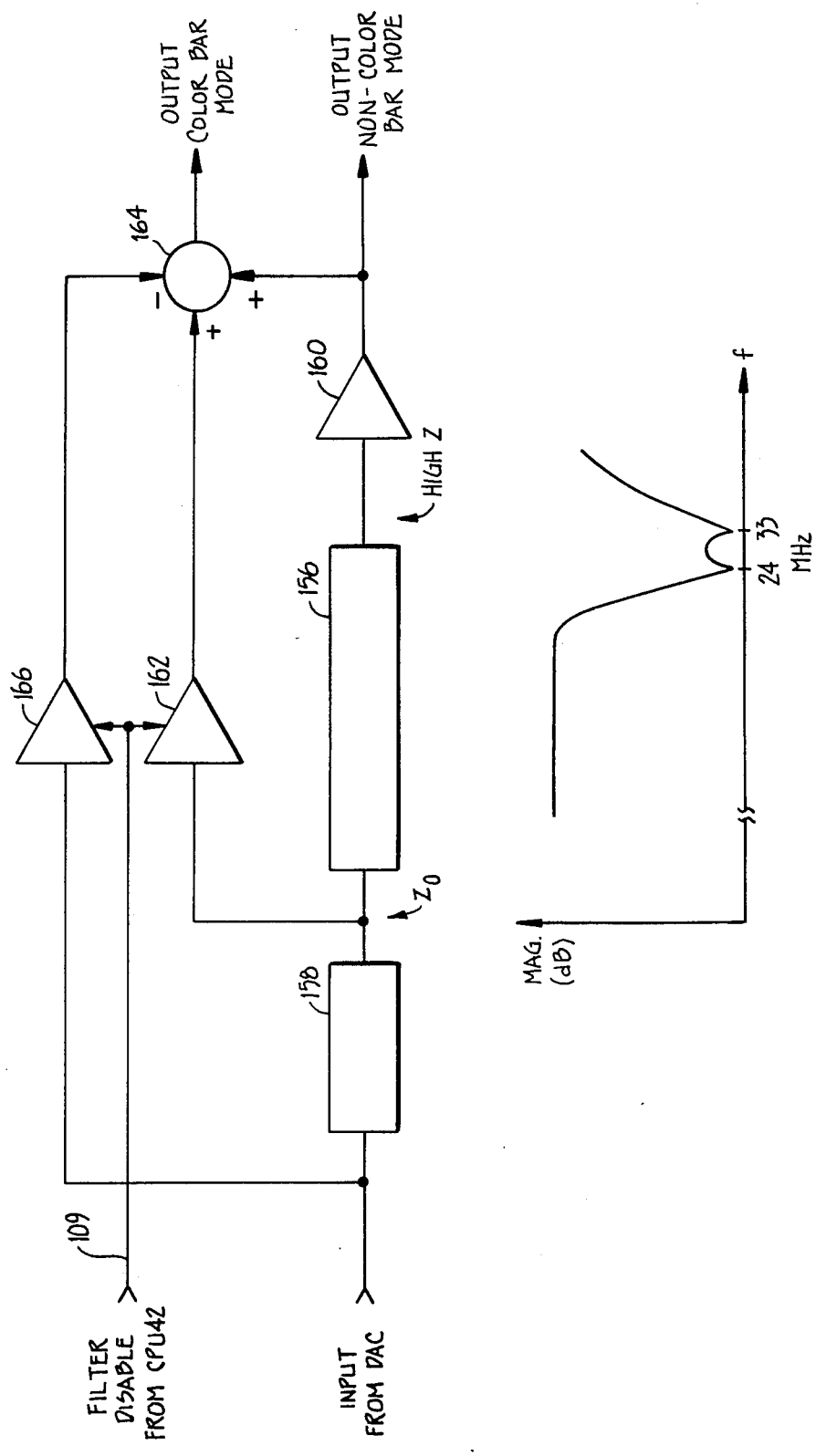
FIG. 6 is a simplified block diagram of a transversal filter employed in the present invention in conjunction with the generation of color bar test signals.

Referring to FIG. 6, a functional block diagram of the transversal filter is shown. Generally, the transversal filter of the present invention utilizes the property that a high frequency signal traveling down a delay line having a characteristic impedance $Z_0$, at the frequency of the signal, will be substantially totally reflected upon incidence with an unterminated end of the delay line. The other property utilized is that a signal traveling down a delay line having an electrical length of one quarter wavelength, or an odd multiple thereof, as determined by the frequency of the signal, will shift in phase by 90 degrees with each traversal of the path. As can be seen from FIG. 6, the transversal filter includes a delay line 166 which has a one quarter wavelength at approximately 12 MHz and odd multiples thereof. Also included is a delay line 158, which when combined with delay line 166, has a quarter wavelength at approximately 8 MHz and odd multiples thereof. The output of delay line 156 is terminated in a high impedance by way of high impedance amplifier 160. The input to delay line 156 is terminated in the characteristic impedance $Z_0$ of delay line 156. With the above structure, the 12 MHz frequency components (and odd multiples thereof) in the input waveform will be reflected from the interminated end of delay line 156 and back to the input of delay line 156 with a 180 degree phase. Thus, at the input to delay line 156, the reflected 12 MHz frequency component will cancel, or null-out, any corresponding component in the incoming waveform. Similarly, at the input to delay line 158; 8 MHz frequency components (and odd multiples thereof) will be nulled out.

In transversal filter 168, the signal from the digital to analog converter from a particular channel is supplied to delay line 158. As shown in FIG. 6, the signal emerging from delay line 158 is supplied to the input to delay line 156 as well as the input to amplifier 162. The input impedance of amplifier 162 is such that the combined loading of amplifier 162 and delay line 158 on the input of delay line 156 is equivalent to the characteristic impedance $Z_0$ of delay line 156.

The outputs of amplifiers 160 and 162 are connected to summing circuit 164, where they are added together. The output of amplifier 166 is also supplied to summing circuit 164, where it is subtracted from the sum of the outputs of amplifiers 160 and 162. When the signals are supplied to summing circuit 164 in the above described manner, the output of summing circuit 164 will have the frequency response illustrated in FIG. 6.

When a signal from a digital to analog converter having a 24 MHz sampling component therein is provided to the transversal filter, said 24 MHz component will be nulled out of the signal.

In the non color bar mode, the frequencies present in the signals from the digital to analog converter of a particular channel will be high enough so that delay lines 156 and 158 will have negligible effect on the signals. As such, the output waveform is taken from amplifier 160. CPU 42 supplies a filter disable command on line 109 to disable the transversal filters 168 when in the non-color bar mode.

Figure 5:
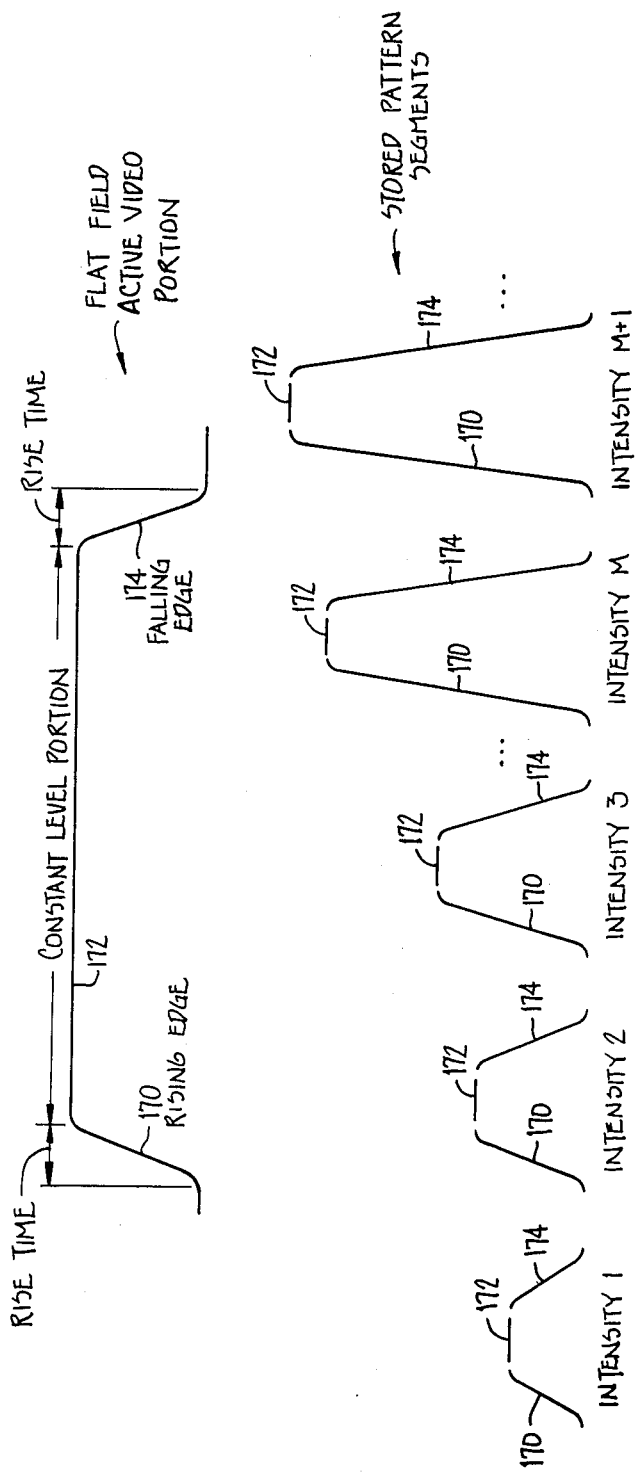
FIG. 5 illustrates the active video portion for a flat field test signal.

Referring to FIG. 5, typical pattern segments for the generation of a flat field test signal are illustrated. By way of background, a flat field test signal requires that the visual image which is produced exhibit a uniform intensity across the entire screen, wherein the level of intensity is selectable. The active video portion of the typical flat field test signal can be defined by a rising-edge portion 170, a constant level portion 172, and a falling edge portion 174. This active video portion is repeated for each active video line in the test signal. As can be seen from FIG. 5, the rise times for the falling and rising edges are constant and thus not a function of the magnitude of the constant level portion. Conversely, because the rise times are constant, the slope of the rising and falling edges will vary as a function of the selected intensity level for the test; i.e. the magnitude of the constant level portion.

Thus, in order to define the active video portion of a flat field test signal for a selected intensity level, the following are stored in pattern ROM 38 for transfer to addressable memory 25: (1) data defining the entire rising edge, (2) data defining the entire falling edge, and (3) data defining the magnitude of the constant level portion. Similar pattern data are stored which correspond to all other possible intensity levels.

In operation, when the user specifies a flat field test signal of a particular intensity, CPU 42 will cause the pattern data, which correspond to the selected intensity level, to be transferred from pattern ROM 38 to addressable memory 25. The control ROMs 45 will remain the same. During the run mode, the control ROMs 45 will cause the rise time pattern data to be read from addressable memory 25. The control ROMs 45 will then cause the constant level data to be read and held as the addressable memory output for the appropriate length of time. Finally, the control ROMs 45 will cause the falling edge data to be read out, to complete the generation of the active video portion.

Figure 11:
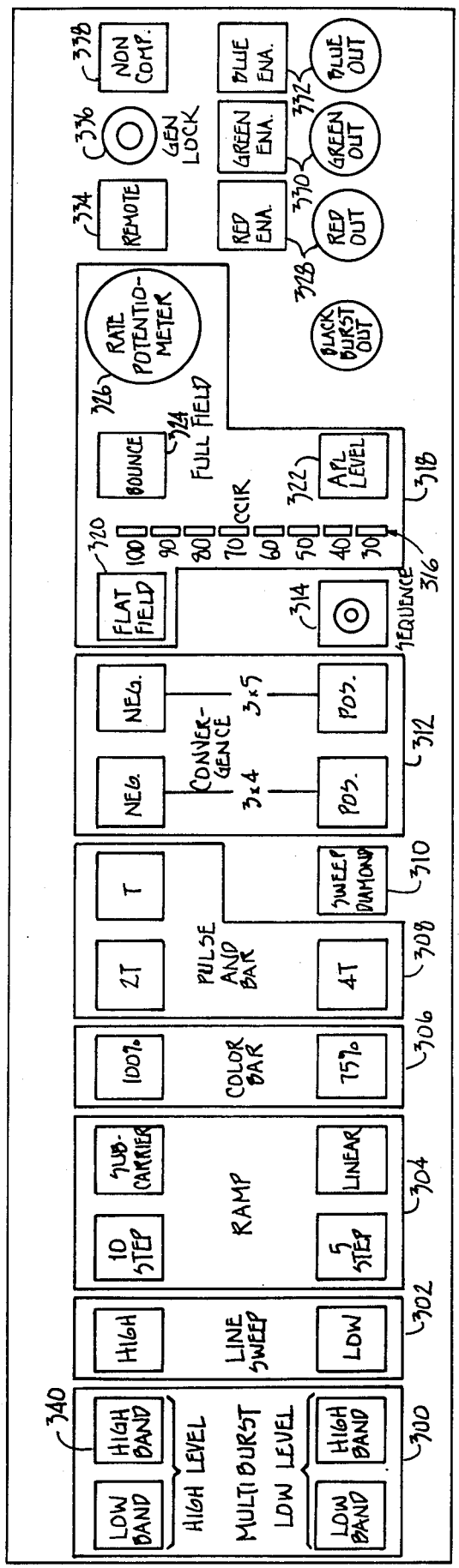
FIG. 11 illustrates the control panel of the present invention.

Referring to FIG. 11, the control panel for the preferred embodiment of the present invention is illustrated. The control panel provides the switches by which the user instructs the CPU 42 regarding the test signals to be generated.

Generally, the switches are organized in groups. Each group corresponds to a test signal which can be generated. The switches, in blocks 300, 302, 304, 306, 308, 310, and 312, when individually pressed, will cause the generation of the test pattern described thereon. For example, group 300 permits the selection of a multiburst test signal. If the user were to press the high-level high-band switch 340, a multiburst signal having a high intensity level (e.g., 70 CCIR peak-to-peak) will be generated with frequency bursts of 2, 10.9, 14.0, 19.6, 24.6, and 38.8 MHz.

Switch group 302 provides a line sweep from 2 MHz to 32 MHz, with markers, at a high or low average picture level (APL).

Switch group 304 permits the selection of a ramp active video waveform with either a subcarrier, a linearly increasing intensity, a 5-step intensity, or a 10-step intensity thereon.

Switch group 306 provides the selection of the color bar test signal with either a 100 percent range of APL or a 75% range of APL.

Switch group 308 controls the generation of the pulse and bar (pulse and window) test signal, with the width of the pulse portion being selectable as 1T, 2T or 4T.

Switch 310 controls the generation of a sweep diamond test signal.

Switch group 312 provides control for the convergence test signal, which will be described in greater detail to follow.

Switch group 318 permits the selection of and the attributes for a flat field test signal. Switch 334 permits the control of the test signal generator from a remote set of control switches.

Switch 338 causes the test signal generator to provide a test signal having an active video portion only, wherein the portions which normally correspond to the horizontal sync and burst portions have a black level instead.

The red channel enable switch and red channel output connector are labelled by reference numeral 328. Reference numeral 330 labels the switch and connector for the green channel, and reference numeral 332 labels the switch and connector for the blue channel. By activation of the switch associated with a particular channel, that channel can be either enabled or disabled.

Sequence switch 314 indicates to the CPU that a sequence of test patterns is sought to be sent up by the user. When the user depresses switch 314, the CPU 42 will record those switches, in sequence, which the user thereafter activates. These switches are recorded in a queue. When switch 314 is again degressed, CPU 14 will be caused to execute the recorded sequence of programs.

The switches in group 312, associated with the convergence test signal, will now be described in greater detail. In the non-sequence mode, the switches in the group permit the selection of a cross-hatch or a dot pattern, or an alternating cross-hatch/dot pattern. Depending upon the switch pushed, the pattern will have either a 3 by 5 or a 3 by 4 aspect ratio, and will have either a negative or positive image; that is, with a negative image, the background is white and the pattern is black, while with the positive image, the background is black and the pattern is white.

When the user pushes any one of the switches in group 312 once, the CPU 42 interprets this as a request for a cross-hatch pattern. If the user pushes the same switch twice, the CPU 42 interprets this as a request for a dot pattern; i.e., a pin cushion pattern. If the user pushes the same switch a third time, the CPU 42 interprets this as a request for an alternating cross-hatch and dot pattern, where the test signal alternates on a frame basis between a dot pattern and a cross-hatch pattern.

With respect to the switch group 318, control of the flat field test signal is provided thereby. When the user depresses flat field switch 320, CPU 42 will be instructed to generate a flat field test signal having an average picture level of 30 CCIR. If the user thereafter depresses APL level switch 322, the average picture level of the flat field can be increased within the range of 30 to 100 CCIR.

If the user holds-in APL level switch 322 for more than one second, the CPU 42 will be instructed to automatically increase the APL level over a predetermined period of time from between 30 to 100 CCIR, in 10 CCIR increments.

If the user depresses flat field switch 320 and then bounce switch 324, CPU 42 will be instructed to provide a test signal with a flat field which alternates between 40 and 90 CCIR at a rate controlled by rate potentiometer 326. The fastest rate is preferably once every other frame, while the slowest rate is once every 8 and one-half seconds per intensity level.

Bar graph LED indicators 316 provide a visual readout for the intensity level of the active video portion of the test signal being generated.

Generator lock LED 336 is illuminated to indicate whenever an internal phase lock loop oscillator is locked to an externally supplied video input reference.

Figure 12:
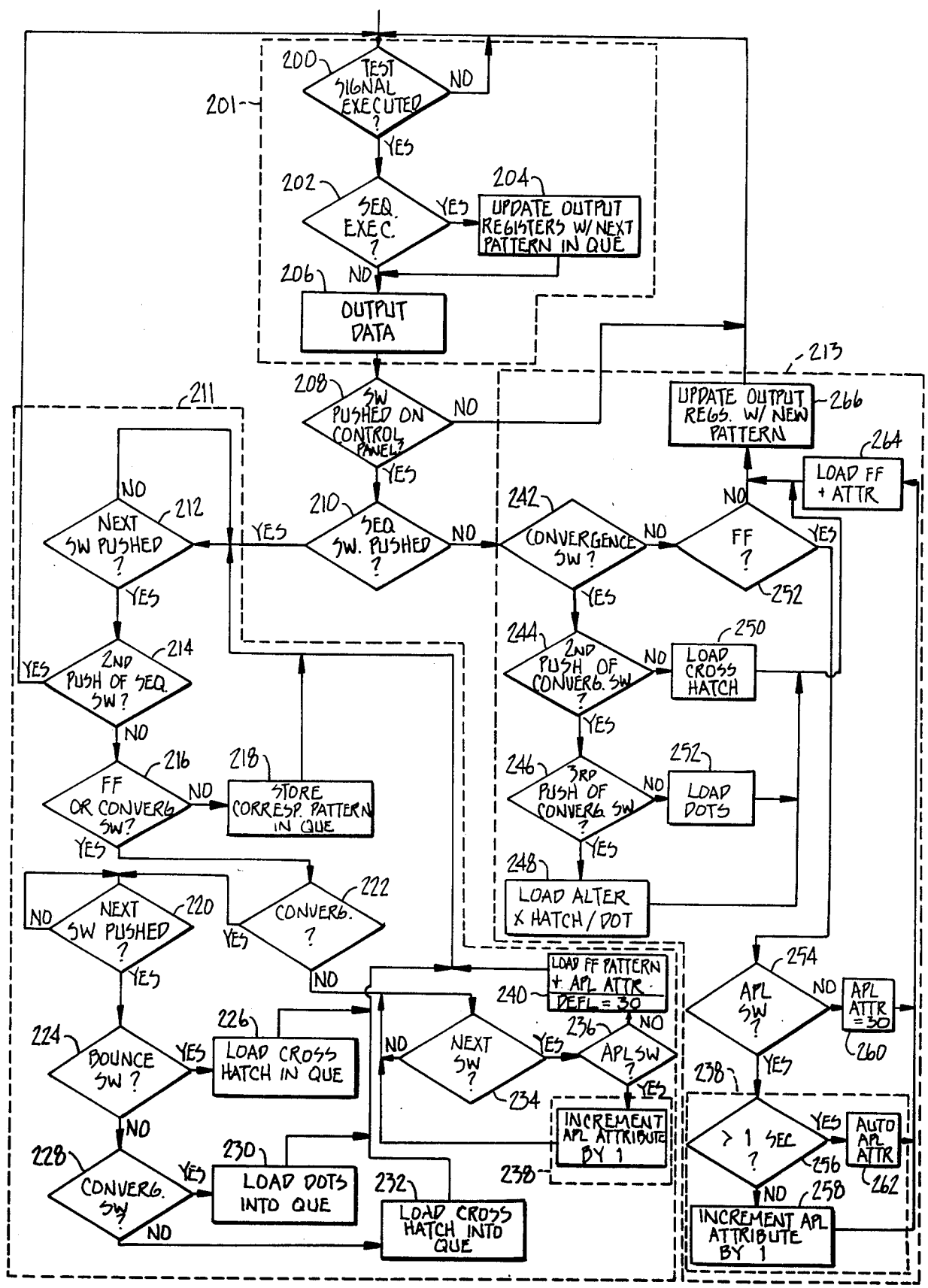
FIG. 12 is a flow diagram illustrating the test signal sequence programming of the present invention.

Referring now to FIG. 12, a more detailed explanation of the manner in which the CPU processes the information from the control panel switches will be provided. The blocks encompassed by dotted lines 201 refer to the operation of the present invention as discussed earlier wherein the CPU 42 causes a sequence of test patterns to be generated, in which the sequence of test patterns is specified by the user. In step 200, the CPU 42 determines whether the current test signal being generated has been completed. The CPU 42 holds in step 200 until the test signal is completed. In step 202, the CPU 42 determines whether a sequence of test signal is being generated. If so, it proceeds to step 204 in which its output registers are updated with the next pattern from the queue, as stored, for example, in auxiliary memory 51. The CPU then proceeds to step 206 in which the data are outputted to ROM address counter 94 and RAM load counter 96 to load the required pattern from pattern ROM 38 into addressable memory 25, and to designate the appropriate control ROMs 45. If, in step 202, it is determined that a sequence of test signals is not being executed, the CPU 42 then proceeds directly to step 206.

Following step 206, the CPU, in step 208, determines whether any switches on the control panel have been pressed; if not, the CPU proceeds back to step 200 and continues its execution of the existing test signals.

If, on the other hand, in step 208, a switch has been pushed, the CPU will proceed to step 210 in which it is determined whether the sequence switch 314 has been pushed. If such is the case, the CPU 42 enters a sequence load mode which includes the blocks encompassed by dotted line 211. If, in step 210, the sequence switch 314 has not been pushed, the CPU 42 proceeds into a single pattern load mode, dotted lines 213.

In the single-pattern load mode 213, the CPU 42 first checks to see whether or not any of the convergence switches 312 have been pushed, step 242; it not, the next step executed is step 252 in which it is determined whether the flat field switch 320 has been pushed. If not, the pattern corresponding to the switch which was actually pushed, e.g., color bars, is loaded into the output registers, step 266, and the CPU 42 returns to step 200.

If in step 242 one of the convergence switches is pushed, the CPU will proceed to step 244 to determine whether the current pushing of the convergence switch was the second pushing thereof. If not, a cross-hatch pattern is designated in step 250 to be loaded into the output registers in step 266. If, on the other hand, the convergence switch was pushed at least twice, the CPU 42 will proceed to step 246 in which it would be determined whether the convergence switch had been pushed a third time. If not, the CPU 42 in step 252 will designate a dot pattern to be loaded into the output registers in step 266.

If, in step 246 the convergence switch had been pushed three times, step 248 would then be executed to designate a pattern which alternates between cross-hatch and a dot pattern on a frame-to-frame basis for loading into the output registers in step 266.

If, in step 252, it is determined that the flat field switch 320 had been pushed, the next step to be executed would be step 254 in which the APL level switch 322 would be checked. If the APL switch had not been pushed, CPU 42 would proceed to step 260 in which a default value for the average program level attribute would be designated as thirty. Thereafter, in step 264, the flat field pattern with the designated attribute level would be indicated for loading into the output registers in step 266.

If, on the other hand, in step 254, the APL switch was found to have been pushed, the CPU 42 would determine whether the switch had been pushed for more than one second in step 256. If not, the CPU 42 would proceed to step 258 in which the APL attribute level would be incremented by 1 from the previous attribute level. The CPU 42 would then proceed to step 264 in which the flat field test signal and the updated APL attribute level would be designated for loading into output registers in step 266.

If, in step 256, the CPU 42 determines that the APL switch had been depressed for more than one second, step 262 would be executed in which the automatic APL attribute level increment by 1 would be designated. After step 262 has been executed, the CPU would proceed to step 264 to designate the flat field and the appropriate attribute level as before.

Referring now to the sequence mode 211, the CPU would, in step 212, wait until the next switch is pushed. When that occurs, the CPU would proceed to step 214 in which it would be determined whether the sequence switch had been pushed for a second time. If so, this would cause the CPU to proceed back to step 200 and out of the sequence load mode to begin execution of the sequence, if any, or to display the designated pattern.

If, on the other hand, the sequence switch 314 had not been pushed for the second time, step 214, the next step 216 would be processed. In this step, it would be determined whether either the flat field switch 320 or any of the convergence switches 312 had been pushed. If not, step 218 would be executed in which the pattern corresponding to the switch actually pushed would be scored in the queue. Recall that CPU 42 maintains a queue of the test patterns to be generated in the test sequence. Thereafter, CPU 42 would return to step 212 and wait for the next switch to be pushed.

If, on the other hand, in step 216, either flat field or one of the convergences switch was pushed, step 222 would be the next step to be executed. In step 222, the CPU 42 would determine whether the convergence switch was pushed. If not, the CPU would proceed to step 234 and wait for the next switch to be pushed, it being assumed that if the switch pushed in step 222 was not the convergence switch, the switch must have been the flat field switch.

When the next switch has been pushed, in step 234, CPU 42 will determine whether that switch was the APL switch 322, step 236. If not, the CPU will proceed to step 240 in which the flat field pattern would be loaded into the queue with a default APL level of 30.

If, on the other hand, in step 236, the APL switch 322 had been pushed, the APL attribute would be incremented by 1, step 238. It is to be understood that also available in step 238 would be the automatic APL attribute feature discussed in connection with step 262 above.

After execution of step 238, the CPU 42 would proceed to step 234 to determine the identity of the next switch. If the APL switch continues to be pushed, the APL attribute level will be incremented accordingly until a switch different from the APL 322 had been pushed.

If in step 222 it was determined that the convergence switch was pushed, the CPU would proceed to step 220 in which it would wait for the next switch to be pushed. When that occurs, the CPU, in step 224, will determine whether the switch pushed is the bounce switch 324. If such is the case, a cross-hatch pattern will be loaded into the queue in step 226, and the CPU will return to step 212. If in step 224 the bounce switch had not been pushed, step 228 would be executed in which the convergence switch 322 would be examined. If the convergence switch had been pushed, a dot pattern will be loaded into the queue in step 230 and the CPU would then proceed back to step 212.

If in step 228 the switch pushed was not the convergence switch, CPU 42 would proceed to step 232 to load the cross-hatch pattern into the queue. Thereafter, the CPU 42 would proceed back to step 212.

As can be seen from the above-discussion, the present invention permits an individual test signal to be generated which has a specified test pattern, or a sequence of test signals to be generated having a different set of test patterns.

In the sequence mode, rate potentiometer 326 determines the amount of time each of the patterns in the sequence will be present.

In the above discussion, it is to be understood that the flow chart of FIG. 12 is representative of the operation of the present invention with respect to the selection of test signals to be generated. It is also to be understood that during or in conjunction with its execution of any particular step in the flow chart, e.g. step 212, the CPU 42 may be processing other portions of the operating program.

Although the foregoing invention has been described in some detail by way of illustration and example for purposes of clarity of understanding, it is understood that certain changes and modifications may be practiced within the spirit of the invention as limited only by the scope of the appended claims.

I claim:

1. A test signal generator comprising an output terminal;
  means for generating a plurality of test signals;
  means for selecting one or more of said test signals;
  means for memorizing the order of selection of said selecting means;
  means for supplying said selected test signals to said output terminal sequentially in response to said order memorizing means; and
  means for controlling said supplying means so as to change the time duration for the continuation of each of said selected test signals.

2. A test signal generator comprising
  means for generating a plurality of test signals;
  means communicating with said generating means for selecting separate test signals from said plurality of test signals;
  means communicating with said selecting means for designating the order of selection from said plurality of test signals;
  an output terminal;
  means communicating with said generating means for supplying said selected test signals to said output terminal, in the order specified by said designating means, wherein the supplying means supply each of said selected test signals for a predetermined time period; and
  means for controlling said supplying means so as to modify the predetermined time interval.

3. A test signal generator comprising
  pattern memory means for storing sets of pattern data, each of which is representative of one of a plurality of test signals, wherein each of said plurality of test signals has a fixed duration in time;
  reconstructing means communicating with the pattern memory means for reconstructing test signals from the stored pattern data;
  programmable means for storing various orders of selection of the stored pattern data by the reconstruction means; and
  means responsive to the programmable order means and communicating with the reconstructing means for specifying sets of pattern data in accordance with one or more stored selection orders so that test signals are reconstructed in a sequence in accordance with said selection order, wherein said specifying means include means for providing selected ones of the specified sets of pattern data to the reconstructing means so that the test signals generated from the selected ones of pattern data have a time duration which differ from the fixed duration in time.

4. A test signal generator comprising
  means including an addressable memory, for storing data representative of a predetermined test signal pattern at designated memory locations; and
  means for sequentially and repetitively addressing selected locations and sequences of locations of the storing means to read a sequence of data from the storing means which sequence is representative of said predetermined test signal pattern; wherein said addressable memory include
    a plurality of addressable memories which receive the sequences of addresses in common from the addressing means for storing the data, so that for each address in the sequences of addresses each addressable memory provides a binary word of data, said binary words of data collectively forming a set of binary words; and
    means for converting the set of binary words into said sequence of data in the form of a serial sequence of the binary words.

5. The test signal generator of claim 4 further comprising a read clock, a sequence clock and wherein the addressing means supplies addresses to the plurality of addressable memories according to the read clock wherein the converting means include switch means having a plurality of inputs and an output, each input receiving one of the binary words from each set of binary words, and further wherein the switch means sequentially connect each of the inputs to the output according to the sequence clock, the sequence clock having a frequency which is substantially M times greater than the read clock, in which M equals the number of binary words in each set of binary words.

6. A test signal generator comprising
means including an addressable memory, for storing data representative of a predetermined test signal pattern at designated memory locations, and
means for sequentially and repetitively addressing selected locations and sequences of locations of the storing means to read sequence of data from the storing means which sequence is representative of said predetermined test signal pattern; wherein the addressing means comprise
means for providing starting address generation instructions which designate a number of starting locations in the storing means and the order in which the designated starting locations are to be addressed;
means responsive to the starting address generation instructions for assembling sequences of following addresses associated with each starting address, and
means for reading data from the storing means in accordance with the sequences of addresses.

7. Apparatus for generating frame waveform pattern test signals for controlling a raster scanning display means to produce a designated visual image on the display means, the apparatus comprising
means for storing a plurality of pattern segments which are representative of selected portions of the frame waveform pattern, wherein the frame waveform pattern includes synchronization, burst, and active video signals, and further wherein the stored pattern segments in the storing means are representative of selected portions of the synchronization, burst, and active video signals;
means for retrieving predetermined stored pattern segments and for repeating or holding them in a predetermined order to construct, in real time, a sequence of pattern segments which is representative of the entire frame waveform pattern; and
means for converting the sequence into test signals representing the frame waveform pattern, wherein the frame waveform has a plurality of pattern segments, including unique pattern segments and definitive pattern segments, the definitive pattern segments being definitive of all non-unique pattern segments in the frame waveform, and further wherein said stored pattern segments comprise said unique pattern segments and said definitive pattern segments.

8. The apparatus of claim 7 wherein any given portion of the frame waveform can be reconstructed from some subset of the pattern segments stored in the storing means.

9. Apparatus for generating frame waveform pattern test signals for controlling a raster scanning display means to produce a designated visual image on the display means, the apparatus comprising
means for storing a plurality of pattern segments which are representative of selected portions of the frame waveform pattern;
means for retrieving predetermined stored pattern segments and for repeating or holding them in a predetermined order to construct, in real time, a sequence of pattern segments which is representative of the entire frame waveform pattern; and
means for converting the sequence into test signals representing the frame waveform pattern;
wherein the frame waveform pattern includes synchronization, burst, and active video signals, and the stored pattern segments in the storing means are representative of selected portions of the synchronization, burst, and active video signals; and further wherein the frame waveform pattern has a plurality of segment patterns, including unique patterns and common patterns, which collectively define the waveform, and the stored pattern segments include the unique segment patterns and segment patterns which are representative of the common patterns.

10. Apparatus for generating frame waveform pattern test signals for controlling a raster scanning display means to produce a disignated visual image on the display means, the apparatus comprising
means for storing a plurality of pattern segments which are representative of selected portions of the frame waveform pattern, wherein the plurality of pattern segments are stored in the storing means at predetermined storage addresses;
means for retrieving predetermined stored pattern segments and for repeating or holding them in a predetermined order to construct, in real time, a sequence of pattern segments which is representative of the entire frame waveform pattern, wherein the retrieving means access the storing means by supplying thereto a selected sequence of said predetermined addresses to construct the sequence of retrieved pattern segments, and further wherein the retrieving means include
means for supplying a series of start addresses, segment length data corresponding to each start address, and a plurality of hold commands which are correlated to selected hold points in said selected sequence of said predetermined addresses, and
address set generating means which communicate with the supplying means and the storing means for generating sets of addresses which collectively form the predetermined sequence of addresses, wherein each set of addresses begins at one of the start addresses in said series of start addresses and includes a number of addresses specified by the corresponding segment length data, the sets of addresses being generated according to the order of start addresses in the series of start addresses to form the predetermined sequence of addresses, and further wherein, when one of the selected hold points in the predetermined sequence of addresses is reached, the address then being generated by the generating means is repeated for the duration of the corresponding hold command; and
means for converting the sequence into test signals representing the frame waveform pattern.

11. The apparatus of claim 10 wherein the supplying means comprise
memory address means communicating with the address set generating means for supplying a consecutive sequence of addresses which is updated whenever the address set generating means complete the generation of each set of addresses; and
memory means communicating with the memory address means for supplying the starting addresses, the segment length data and the hold command thereto in response to each address in said consecutive sequence of addresses to form said series of starting addresses.

12. The apparatus of claim 11 wherein the generating means comprise
   storage address means responsive to said series of starting addresses for generating an address set corresponding to each starting address;
   means responsive to the segment length data for controlling the storage address means and memory address means to halt the address set generation corresponding to a particular starting address when the number of addresses in the set corresponds to the segment length data for the particular starting address and to initiate the generation of the next address set corresponding to the next starting address in the series of addresses; and
   means responsive to the hold commands for regulating the storage address means so that the address then being generated by the storage address means is held constant in the address set for the duration of the hold command when the corresponding hold point in the predetermined sequences of addresses is reached.

13. The apparatus of claim 12 wherein the memory address means is a counter having a count which is updated whenever the generation of an address set is halted by the controlling means.

14. The apparatus of claim 12 further including a memory clock, wherein the storage address means is a run counter having a run count which is incremented by the memory clock, which run count begins at the starting address from the memory means, and further wherein the run counter holds its count whenever a hold command is present.

15. The apparatus of claim 14 wherein the controlling means include
   length counter means which receive segment length data from the memory means, corresponding to the starting addresses received by the run counter, for monitoring the run counter and for generating a reset signal when the number of memory clock cycles received by the run counter, following its receipt of each staring address, corresponds to the length specified in the segment length data for that starting address, and wherein the reset signal is supplied to the address counter to update the count therein and is supplied to the run counter to begin the run count for the next starting address from the memory means.

16. Apparatus for generating frame waveform pattern test signals for controlling a raster scanning display means to produce a designated visual image on the display means, the apparatus comprising
   means for storing a plurality of pattern segments which are representative of selected portions of the frame waveform pattern;
   means for retrieving predetermined stored pattern segments and for repeating or holding them in a predetermined order to construct, in real time, a sequence of pattern segments which is representative of the entire frame waveform pattern; and
   means for converting the sequence into test signals representing the frame waveform pattern;
   wherein the pattern segments are stored at predetermined storage addresses in the storing means and the retrieving means retrieves pattern segments from the storing means by supplying thereto a selected sequence of said predetermined storage addresses and further wherein the storing means compromise
   a plurality of addressable memories, which are addressed in parallel by the selected sequence of predetermined storage addresses, to provide a set of binary words for each address in the sequence, with each of the addressable memories providing one of the binary words in each set of binary words; and
   means responsive to each set of binary words for converting each set into a serial stream of parallel binary words, so that the rate at which the binary words appear in the serial stream of parallel binary words is substantially greater than the rate at which each set of binary words is provided from the plurality of addressable memories.

17. The apparatus of claim 16 wherein the converting means are switching means having an output and a plurality of inputs, in which each of the inputs receives a different one of the binary words from said set of binary words for sequentially connecting each of the inputs to the output.

18. The apparatus of claim 17 wherein the switching means are a multiplexer.

19. The apparatus of claim 16 further including digital to analog conversion means which are responsive to the serial stream of binary words for converting each binary word in the serial stream into an analog signal level representative of the binary word.

20. The apparatus of claim 19 wherein the analog to digital conversion means include
   a plurality of digital to analog converters;
   a plurality of temporary storage means each of which is responsive to the serial stream of binary words during the presence of an associated enable signal, and each of which is associated with one of the plurality of digital to analog converters, for receivng the binary word to be converted; and
   means communicating with the plurality of temporary storage means for enabling each of the plurality of temporary storage means to receive a designated binary word in the serial stream of binary words.

21. The apparatus of claim 20 wherein the enabling means enable each temporary storage means to receive each binary word, in order, in the serial stream of binary words.

22. The apparatus of claim 20 in which there are N pairs of temporary storage means and digital to analog converters and wherein each set of binary words has N binary words and further wherein the enabling means sequentially enable the temporary storage means so that each temporary storage means receives the binary word which occupies the same position in each set of binary words, where N is integer greater then zero.

23. The apparatus of claim 22 wherein the enabling means sequentially enable the temporary storage means so that the position in the set of binary words from which a particular temporary storage means receives a binary word differs for each of the plurality of temporary storage means.

24. The apparatus of claim 23 further comprising an output clock and wherein the binary words in the serial stream of binary words appear at a rate determined by the output clock and further wherein the enabling means include N-bit ring counter means responsive to the output clock and having N outputs, with each output communicating with a different temporary storage means, and in which the N-bit ring counter means provides an enable signal at each of its outputs, sequentially, one output at a time.

25. A method for generating a test signal comprising the steps of
   storing data representative of a first signal pattern at designated locations in storage means; and
   sequentially addressing a predetermined set of locations in the storage means including the steps of
      generating an address set having addresses corresponding to selected locations in the storing means;
      repeating selected addresses in the address set, and
      repeating selected address sequences in the address set; so that selected portions of the first signal pattern are either excluded, repeated or extended to generate a signal pattern representative of said first signal pattern.

26. The method of claim 25 wherein the data stored in the storing means is representative of a signal having a zero level except for a short segment of non-zero level which precedes a longer segment of the same non-zero level, the addressing step further including the steps of
   generating a first address set which addresses all of the locations in the storing means;
   generating a second address set which addresses all of the locations in the storing means except for the locations containing data representative of the longer segment of non-zero level;
   inserting a repetitive address sequence into the second address set at the point where the address for the longer segment of non-zero data were excluded; and
   forming a third address set from the first and second address set by
      repeating the second address set a first predetermined number of times;
      repeating the first address set a second predetermined number of times, and
      repeating the second address set for the first predetermined number of times.

27. In combination with a test signal generator as recited in claim 20, controllable transversal filter means for filtering out a sampling component signal from said test signals in response to a control signal.

28. A test signal generator comprising an output terminal;
   means for generating a plurality of test signals;
   means for selecting one or more of said test signals;
   means for memorizing the order of selection of said selecting means;
   means for supplying said selected test signals to said output terminal sequentially in response to said order memorizing means; and
   controllable transversal filter means for filtering out a sampling component signal from said test signals in response to a control signal.

* * * * *